US012077374B2

(12) United States Patent
Müller

(10) Patent No.: US 12,077,374 B2
(45) Date of Patent: Sep. 3, 2024

(54) USE OF A RESILIENTLY BENDABLE LONG MATERIAL COMPRISING TWO FREE ENDS FOR STRETCHING AN OPENING EDGE OF AN OPENING OF A FLEXIBLE CONTAINER, LONG MATERIAL FOR A USE OF THIS KIND, AND HOLDING DEVICE FOR HOLDING THE FLEXIBLE CONTAINER HAVING AN OPENING EDGE STRETCHED BY THE LONG MATERIAL

(71) Applicant: Michael Müller, Buchbach (DE)

(72) Inventor: Michael Müller, Buchbach (DE)

( * ) Notice: Subject to any disclaimer, the term of this patent is extended or adjusted under 35 U.S.C. 154(b) by 0 days.

(21) Appl. No.: 17/923,551

(22) PCT Filed: May 12, 2021

(86) PCT No.: PCT/EP2021/062711
§ 371 (c)(1),
(2) Date: Nov. 4, 2022

(87) PCT Pub. No.: WO2021/228991
PCT Pub. Date: Nov. 18, 2021

(65) Prior Publication Data

US 2023/0192396 A1 Jun. 22, 2023

(30) Foreign Application Priority Data

May 15, 2020 (DE) .................... 10 2020 113 248.4

(51) Int. Cl.
*B65D 1/00* (2006.01)
*B65F 1/00* (2006.01)
*B65F 1/16* (2006.01)

(52) U.S. Cl.
CPC ............ *B65F 1/002* (2013.01); *B65F 1/0013* (2013.01); *B65F 1/16* (2013.01); *B65F 2210/18* (2013.01)

(58) Field of Classification Search
CPC .. B65F 1/014; B65F 1/012; B65F 1/01; B65F 1/008; B65F 1/006; B65F 1/004;
(Continued)

(56) References Cited

U.S. PATENT DOCUMENTS 4,664,348 A 5/1987 Corsaut, III et al.
4,669,690 A 6/1987 Mceniry
(Continued)

FOREIGN PATENT DOCUMENTS

DE 60017131 T2 2/2005
SE 513557 C2 10/2000

OTHER PUBLICATIONS

German Application No. DE102020113248.4, Examination Report mailed Jan. 25, 2021, 6 pages.
(Continued)

*Primary Examiner* — Kareen K Thomas
(74) *Attorney, Agent, or Firm* — Kilpatrick Townsend & Stockton LLP

(57) ABSTRACT

Elastically bendable elongate material with two free ends for stretching an opening edge of an opening of a flexible container. The elongate material, through elastic bending, is brought from a non-use position, in which it is not stretching the opening edge, into an insertion position, in which it is pretensioned and seeks to adopt the non-use position. In the insertion position it is inserted into the opening where it is brought into a use position in which it is pretensioned and seeks to adopt the non-use position such that the opening edge is stretched in a dimensionally stable manner, the free ends of the elongate material are at a distance from each other and between them hold a portion of the opening edge tensioned in a straight line, and a dimensionally stable stretching occurs only in the region of the opening while the rest of the container remains flexible.

20 Claims, 34 Drawing Sheets

Figure 1:
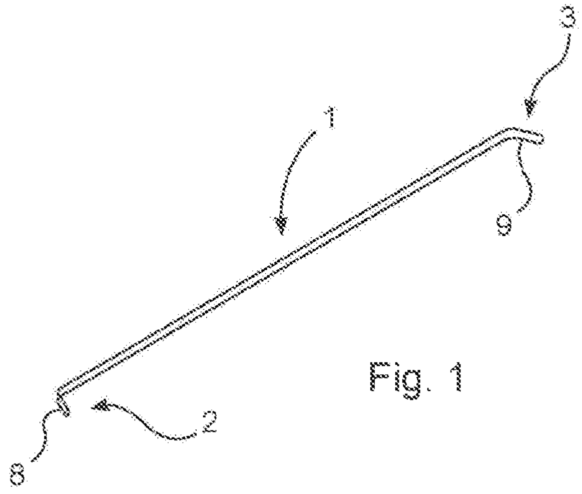

(58) Field of Classification Search
CPC .......... B65F 1/002; B65F 1/0013; B65F 1/16; B65F 2210/18; B65F 1/1415; B65B 2067/1261; B65B 67/1255
See application file for complete search history.

(56) References Cited

U.S. PATENT DOCUMENTS

| | | | | | |
|---|---|---|---|---|---|
| 4,832,291 | A * | 5/1989 | Nelson | B65B 67/1238 D34/5 |
| 4,998,695 | A * | 3/1991 | Nobis | B65B 67/12 248/101 |
| 5,009,378 | A * | 4/1991 | Linsmeyer | B65B 67/12 D34/5 |
| 5,014,943 | A * | 5/1991 | Nelson | B65B 67/1205 141/390 |
| 5,119,960 | A * | 6/1992 | Robbins, III | B65F 1/1415 220/640 |
| 5,593,117 | A * | 1/1997 | Alexander, III | B65F 1/1415 383/33 |
| 5,738,314 | A * | 4/1998 | Davis | B65B 67/1205 248/97 |
| 5,899,419 | A * | 5/1999 | Ross | B65B 67/1238 248/97 |
| 6,086,022 | A * | 7/2000 | Dalton | B65F 1/1415 248/101 |
| D445,550 | S * | 7/2001 | Wigren | D34/6 |
| 7,789,441 | B1 | 9/2010 | Conway | |
| 8,851,542 | B2 * | 10/2014 | Faraone | A47L 13/52 15/257.1 |
| 9,827,921 | B1 * | 11/2017 | Green | B60R 13/0206 |
| 2005/0056650 | A1 * | 3/2005 | Cochrane | B65F 1/06 220/495.08 |
| 2006/0091267 | A1 | 5/2006 | Paloian et al. | |
| 2006/0226152 | A1 * | 10/2006 | Barber | B65F 1/1415 220/495.06 |
| 2006/0231158 | A1 * | 10/2006 | Quiring | B65B 67/1238 141/315 |
| 2007/0001063 | A1 * | 1/2007 | Cheng | B65F 1/1415 248/95 |

OTHER PUBLICATIONS

International Application No. PCT/EP2021/062711, International Search Report and Written Opinion mailed Jan. 10, 2022, 23 pages.

* cited by examiner

USE OF A RESILIENTLY BENDABLE LONG MATERIAL COMPRISING TWO FREE ENDS FOR STRETCHING AN OPENING EDGE OF AN OPENING OF A FLEXIBLE CONTAINER, LONG MATERIAL FOR A USE OF THIS KIND, AND HOLDING DEVICE FOR HOLDING THE FLEXIBLE CONTAINER HAVING AN OPENING EDGE STRETCHED BY THE LONG MATERIAL

CROSS REFERENCE TO RELATED APPLICATION

This application is a U.S. national phase of International Patent Application No. PCT/EP2021/062711 filed on May 12, 2021, which claims priority to German Patent Application No. 10 2020 113 248.4, filed in Germany on May 15, 2020. The entire contents of both applications are hereby incorporated herein by this reference.

I. FIELD OF APPLICATION

The present invention relates to the use of a resiliently bendable long material comprising two free ends for stretching an opening edge of an opening of a flexible container, a long material for a use of this kind, and a holding device for holding the flexible container having an opening edge stretched by the long material. The flexible container can be a sack or a bag, which is used for example in the home, in a workshop, in an agricultural business, or the like. An example for a flexible container within the meaning of the present invention is what is known as a “recycling sack”, which is a waste collection sack for plastics and aluminium waste which is accumulated in the home.

II. TECHNICAL BACKGROUND

It is known to suspend waste collection sacks such as the “recycling sack” on a gathered tape which is introduced peripherally into a channel of the opening edge of the sack. The gathered tape actually serves for closing the opening of the sack. However, a loop of the gathered tape is frequently used for suspending the sack on a hook or the like. In this case, the opening edge of the opening of the sack generally hangs down in a manner limp in form. Filling the sack with waste therefore requires the opening to be kept open by gripping the opening edge by hand. The waste can then be introduced into the sack using the other hand, through the opening, which is kept open to a greater or lesser extent.

Two disadvantages occur in the case of such suspension of the sack. Firstly, at least one of the user’s hands must be used for keeping open the opening and is not available for filling the sack with waste. Secondly, despite the use of a hand, the opening of the sack cannot be kept open at such an opening width as the opening edge itself would allow. Using a hand for keeping the sack open therefore does not result in a geometry of the opening edge of the opening of the sack that allows for the sack to be filled with waste as effortlessly as possible.

In order to overcome these disadvantages, it is known to suspend waste collection sacks, with an opening edge turned down outwards, in frames, which hold the sack in the open state for filling with waste. In this case, the opening edge of the sack is held open generally in a dimensionally stable, usually circular, manner. The known frames thus allow for the sack to be filled by both hands, by the user, through an opening that is held open.

However, the frames have been found to be disadvantageous insofar as they are relatively complex as well as large and thus expensive. For example, they usually comprise a base which is connected to a holding part by means of one or more rods, which holding part bears the sack at the opening edge thereof and holds it in the open state.

III. ILLUSTRATION OF THE INVENTION a) Technical Problem

The problem addressed by the present invention is therefore that of providing a use of a resiliently bendable long material comprising two free ends for stretching an opening edge of an opening of a flexible container, a resiliently bendable long material for a use of this kind, and a holding device for holding the flexible container having an opening edge stretched in a dimensionally stable manner by the long material, by means of which openings, which are limp in form, of flexible containers such as sacks, bags and the like, can be stretched in a dimensionally stable manner as easily and in as uncomplicated a way as possible, and the flexible containers comprising opening stretched in this way can be held in a likewise easy and uncomplicated manner.

b) Solution to the Problem

This problem is solved by a use having the features of claim 1, by a long material having the features of claim 2, and by a holding device having the features of claim 13. Further features of the present invention can be found in the dependent claims.

According to the invention, the use of a long material comprising two free ends, which is resiliently bendable, for stretching an opening edge of an opening of a flexible container such as a sack, a bag or the like, is proposed. The use is implemented such that the long material is brought, by means of resilient bending, from a non-use position, in which it is not used for stretching the opening edge and can be stored, into an insertion position in which it is resiliently preloaded and endeavours to assume the non-use position again.

Subsequently, the long material positioned in the insertion position thereof is inserted into the opening of the container. Finally, the long material inside the opening of the container is preferably brought into a use position by being released, in which use position it is still preloaded and still endeavours to assume the non-use position. The use position deviates from the above-mentioned insertion position insofar as the amount of the resilient preload of the long material in the use position is slightly less than in the insertion position, since the resiliently bent long material has slightly relaxed during movement from the insertion position into the use position.

The resilient relaxation of the long material from the insertion position into the use position takes place such that the opening edge of the opening of the container is stretched in a dimensionally stable manner, the free ends of the long material are spaced apart from one another, and hold therebetween a portion of the opening edge stretched substantially straight. Dimensionally stable stretching takes place exclusively in the region of the opening of the container, while the container remains flexible in the remaining region thereof, i.e. can hang down unstiffened by the long material which is in the use position thereof.

The present invention proposes not only the use of a long material explained above, but rather also a long material for stretching an opening edge of an opening of a flexible container such as a sack, a bag or the like, per se, the long material being resiliently bendable and comprising two free ends. In order to avoid repetitions, with respect to the long material per se reference is made in particular to the features of claim 2. Furthermore, in view of the features and mode of operation of the long material per se reference is explicitly made to the above explanations relating to the use according to the invention of the long material.

The use according to the invention and/or the long material according to the invention allow for dimensionally stable stretching of the opening edge of a flexible container in an extremely simple and uncomplicated manner. In the stretched state thereof, the opening of the container obtains a geometry which allows for uncomplicated filling and emptying of the container. Furthermore, the container remains flexible in the region thereof under the opening, which results in the advantage that a container that is filled only in part can be stored in a space-saving manner, insofar as the volume of the container that is not filled can be reduced to virtually zero by gathering together the container wall surrounding said volume. Furthermore, the long material according to the invention requires significantly less space compared with a conventional frame for holding a flexible container. In this connection, it should be mentioned that the long material, in the non-use position thereof, i.e. in the completely relaxed position thereof, does not necessarily have to extend in a straight line. Bent non-use positions are also conceivable, in which the long material is not resiliently preloaded.

Handling means for form-fitting holding of the long material by the user's hand are preferably arranged at the free ends of the long material. Said handling means make it possible to bring the long material from the non-use position thereof into the insertion position thereof, and to more securely hold the long material, positioned in the insertion position thereof, during insertion of the long material into the opening of the container. Advantageously, the handling means are formed by end portions of the long material, which form a starting angle, relative to a longitudinal axis of the long material, which is greater than 0°. This means that the end portions are in each case angled relative to the longitudinal axis of the long material. At least said starting angle is preferably in the range of from 10° to 85°, particularly preferably in the range of from 40° to 80°. The end portions preferably have the starting angle over their entire extension, as a constant angle relative to the longitudinal axis of the long material. It is alternatively conceivable for the starting angle to be present only at the point at which the respective end portion deviates from the longitudinal axis of the long material, and the respective end portion extends in a curved manner in the further extension thereof, i.e. an imaginary angle of a tangent to the course of the end portion relative to the longitudinal axis of the long material deviates from the starting angle.

The long material according to the invention preferably consists of a one-piece spring element. On account of its simplicity, it can be produced in a particularly cost-effective manner. For example one-piece spring steel or a one-piece spring element made of another resilient material, such as plastics material or carbon or glass fibres, are possible as the one-piece spring element. Alternatively it is possible to assemble the long material from a plurality of individual pieces.

Advantageously, at least the side of the long material which comes into contact with the inside of the opening edge of the flexible container in the use position is provided with an anti-slip surface for increasing the static friction between said side and the opening edge. As a result, slipping of the opening edge of the container from the long material, located in the use position thereof, is impeded, in addition to the effect of the preload of the long material in the use position.

The anti-slip surface can be formed by an anti-slip coating, for example made of silicone or rubber. Alternatively or in addition it is conceivable to form the anti-slip surface having projections which protrude from the corresponding side of the long material in an elevated manner. The projections can be formed for example by separately applied studs or by elevations impressed in the long material.

If the long material, together with the end portions thereof, is projected into a plane, then it has a material length and a material width in the projection plane. The ratio of material length to material width, specific in the individual case, is dependent in particular on the absolute size of the opening of the container, and is preferably at least 20:1, particularly preferably at least 40:1.

For reasons of tilt-resistance mounting of the long material according to the invention in the holding device according to the invention, explained below, the long material is preferably designed having a non-round or flattened cross section. The design of the long material in the form of a strip-like flat material, i.e. the design of the flattened cross section in the form of a rectangle cross section, is particularly preferred. A flat material having a flattened cross section has a lower bending resistance about one of the cross-sectional axes thereof than about the other cross-sectional axis thereof. It can therefore be comfortably bent by hand, with little application of force, about the cross-sectional axis having the low bending resistance, and thereby brought out of the non-use position into the insertion position.

If a flat material having a flattened cross section, in particular a strip-like long material having a rectangular cross section, is used as the long material, then the handling means in the form of the end portions of the long material can be easily bent out of the flat material plane, in particular the strip plane.

According to the invention, a combination of a flexible container such as a sack, a bag or the like having an opening comprising an opening edge, and a long material according to the invention for stretching the opening edge is also proposed.

The present invention furthermore relates to a holding device for holding a flexible container such as a sack, a bag or the like having an opening comprising an opening edge, the opening edge being stretched in a dimensionally stable manner by means of the long material according to the invention. The holding device on the hand comprises a holding means for holding the holding device against falling down on account of gravity, and on the other hand a first receiving means for receiving a holding portion of the long material and an opening edge region of the opening edge of the opening of the container, resting on the holding portion. The holding portion, together with the opening edge region, can be inserted into a receiving cavity of the first receiving means substantially by way of a movement directed counter to the effect of gravity. The use of the term "first" in connection with the feature "a first receiving means" is exclusively for the purpose of distinguishing from further receiving means which, however, do not necessarily have to be present according to the invention. Therefore, the term "first" does not exclude the possibility that the first receiving means may be the only receiving means of the holding device according to the invention.

The receiving cavity preferably has an elongate cross-sectional shape, and the first receiving means is provided, in the region of a lower half of the cross-sectional shape, with an access opening, through which opening the holding portion, together with the opening edge region of the opening of the container, can be inserted into the receiving cavity and can be removed from the receiving cavity. The elongate cross-sectional shape advantageously makes it possible that a long material according to the invention having a non-round or flattened cross section can be held in the receiving cavity, without the long material, located in its use position and bearing the container, being tipped away downwards by a tilting moment resulting from gravity.

The first receiving means can comprise a base projection for defining the receiving cavity thereof, which base projection prevents the holding portion, together with the opening edge region of the opening of the container, from being able to fall out of the receiving cavity on account of gravity.

The base projection is preferably provided with a latching lug which makes it possible to latch the holding portion, together with the opening edge region, into the receiving cavity, through the access opening.

Furthermore, the receiving cavity can be delimited by a front projection which prevents the holding portion, together with the opening edge region, from being able to tilt out of the receiving cavity.

The width of the access opening of the receiving cavity is preferably delimited by the base projection and the front projection.

Some containers comprise an opening edge that is thickened in terms of material. This can be the case for example if the opening edge is provided with a seam and/or the opening edge comprises a peripheral channel having a gathered tape located therein. For such cases, a cross-sectional widening can be provided in an upper half of the elongate cross-sectional shape of the receiving cavity, which widening serves as a buffer space for receiving material of the opening edge region of a thickened opening edge of the container.

It is particularly advantageous to provide the holding device with a lid holder for fastening a pivotable lid, by means of which the opening of the flexible container can be closed. The lid holder can be designed for example in the form of two limbs, having an angled cross section, or in the form of a holder that extends in a manner curved approximately in the shape of a quarter circle, in cross section. The lid holder is intended to penetrate through a slot-shaped aperture in the lid, and to allow for pivoting of the lid in order to open and close the stretched opening of the container.

The holding means provided on the holding device according to the invention, for holding the holding device against falling down on account of gravity, can be designed in various ways, depending on the application. The specific design of the holding means in each case is dependent on where and how the holding device, and thus the container borne by it and having the opening stretched by the long material, is to be held. According to the invention, a plurality of holding or mounting options is proposed.

The holding means can in particular be designed as a handle for guiding the container, having an opening edge stretched in a dimensionally stable manner, by hand. In this case, the handle is arranged such that it protrudes outwards from the opening edge when the holding device bears the container. The container, having the stretched opening edge, can then be guided in a manner similar to a dip net or a butterfly net, by grasping the handle by hand. For example, use in the manner of a dustpan is possible. For this purpose, the handle is held such that the portion of the opening edge which is held in a straight stretched manner between the free ends of the long material, located in the use position thereof, comes to rest on a floor surface, in the region of which collected dirt or waste is located, which is to be swept into the container.

The holding means can also be a fastening flange, by means of which the holding device can be fastened to a fastening surface, such as a wall, a cupboard door, or the like, in such a way that the flexible container can hang downwards, on account of the effect of gravity, and be filled in this state.

It is advantageously conceivable to arrange a hinge between the fastening flange and the receiving means, such that the first receiving means is pivotable relative to the fastening flange.

It is furthermore conceivable to design the holding means as a hook, by means of which the holding device can be suspended such that the flexible container can hang downwards on account of the effect of gravity and can be filled. The hook allows for the container, having the opening edge stretched in a dimensionally stable manner, to be suspended wherever there are suitable rods, wall projections, furniture projections, radiators, or the like.

The receiving cavity comprises a cavity axis extending perpendicularly to the cross section thereof, and the hook spans a hook plane. The cavity axis can extend in parallel with the hook plane, or the cavity axis intersects the hook plane at an angle of 90°. In some fastening situations it is advantageous for the cavity axis of the receiving cavity to intersect the hook plane at an angle which is larger than 0° and smaller than 90°. This is the case for example if the long material bearing the container is intended to be mounted on a drawer or the like, by means of two holding devices according to the invention, each of which engages on one free end or end portion, respectively, of the long material.

The holding means can furthermore be designed as a clamping means, by means of which the holding device can be firmly clamped to a rod or a plate-like object such as a tabletop or the like, such that the flexible container can hang downwards on account of the effect of gravity and be filled.

The holding means can furthermore be designed as a rotation means having a fixed part and a rotary part that is rotatably mounted on the fixed part. In this case, the rotary part can comprise one, two or more receiving means for receiving a holding portion of the long material and an opening edge region of the opening edge resting on the holding portion. The rotation means can be fastened to a fastening surface, by means of the fixed part, such that the rotary part is rotatable relative to the fastening surface and a flexible container can hang downwards on the or on at least one of the receiving means, on account of the effect of gravity. In this case, the axis of rotation, about which the rotary part is rotatable, extends substantially perpendicularly to the fastening surface.

If the fastening surface is for example the underside of a tabletop, then the long material held by the receiving means, together with the container having the opening edge stretched in a dimensionally stable manner, can be pivoted from a parked position, in which the container is located in a space-saving manner under the tabletop, into a use position in which the stretched opening edge of the container protrudes out of the space under the tabletop such that it can be filled.

The rotation means can advantageously in particular comprise two or more receiving means of the type in question. In this case, the rotation means becomes a type of revolving means, and the rotary part becomes a revolving part. Rotating the revolving part then makes it possible for the container, held by a receiving means, to be brought into a parked position under the tabletop, and simultaneously for another container, held by another receiving means, to be brought into a use position in which the other container protrudes out of the space under the tabletop and can be filled.

The holding means can furthermore be a, preferably detachably fitted, suction cap, by means of which the holding device can be fastened to a flat surface, for example tiles in a bathroom, such that the flexible container can hang downwards on account of the effect of gravity. The detachability of the suction cap advantageously allows for simple replacement of a worn suction cap having a reduced adhesive effect, with a new suction cap.

It is particularly advantageous to design the holding device having two different holding means, and to thereby increase the practical value of the holding device.

For example, one holding means can be designed in the form of a suction cap, and a further holding means can be designed in the form of a hook. In this case, the suction cap is preferably arranged on the hook. Furthermore, the suction cap is preferably detachably arranged on the hook.

A further example for the design of the holding device comprising two different holding means consists in providing a clamping limb, in addition to a handle, the handle being designed, in addition to its form as a handle per se, as a counter clamping limb, such that the clamping limb together with the counter clamping limb forms a clamping means which is provided as a further holding means in addition to the holding means in the form of the handle.

The design of the holding device having two different holding means can also be implemented in that a hook provided as a holding means is designed as a further holding means in the form of a handle which can be grasped by a user's hand, in that it comprises a first hook portion, which is located in the hook plane, and a second hook portion, which is angled about an angle of greater than 0° and less than 90° relative to the hook plane. The angled geometry can advantageously be approximated to the physiological shape of a curved palm.

A physiologically advantageous design of the hook that can be used as a handle can furthermore be achieved in that the first hook portion comprises a first side edge, and the second hook portion comprises a second side edge, the first and the second side edge extending straight and in parallel with one another.

Particularly reliable and stable guidance of the holding device designed having a hook that can be used as a handle, together with the stretched container, can be achieved by means of at least one reach-through hole for reaching through with a finger of the user's hand.

The holding device according to the invention can advantageously also be designed as a multifunctional holding device, as explained in the following.

For this purpose, in the event of its holding means being designed as a handle, the holding device can comprise a second receiving means for receiving the holding portion together with the opening edge region, such that the handle protrudes inwards into the opening edge when the holding device holds the container by means of the second receiving means. The handle can then serve as a clamping arm, by means of which the container can be firmly clamped to a tabletop or the like, in a parked position. In this case, the second receiving means is designed just as has been described in connection with the first receiving means. It is merely arranged at a different point of the holding device compared with the first receiving means.

Furthermore, a hook means can be arranged at a free end of the handle. A third receiving means for receiving the holding portion together with the opening edge region can be provided in such a way that the handle functions as a substantially vertically extending suspension arm and the hook means faces the container when the holding device holds the container by means of the third receiving means. The container having the stretched opening edge can then be suspended wherever this relative arrangement of the hook means with respect to the container is advantageous. In this case, the third receiving means is designed just as has been described in connection with the first receiving means. It is merely located at a different point of the holding device compared with the first receiving means.

If a hook means is arranged at a free end of the handle, a fourth receiving means for receiving the holding portion together with the opening edge region can be provided in such a way that the handle functions as a substantially vertically extending suspension arm and the hook means faces away from the container when the holding device holds the container by means of the fourth receiving means. The container having the stretched opening edge region can then be suspended wherever this alternative relative arrangement of the hook means with respect to the container is advantageous. The fourth receiving means is designed just as has been described in connection with the first receiving means. It is merely located at a different point of the holding device compared with the first receiving means.

The terms "first", "second", "third" and "fourth", used above, in connection with the different receiving means serve exclusively to distinguish the receiving means. The above terms do not necessarily mean that the number of receiving means corresponding to the relevant term have to be present on the holding device. For example, it is conceivable for only the first, the third and the fourth receiving means to be provided, while the second receiving means is lacking. It is furthermore conceivable, for example, for only the first and the third receiving means, or only the first and the fourth receiving means, to be provided on the holding device.

In the case of the design of the holding means as a handle, an additional handle can advantageously be provided, which extends in a direction substantially facing away from the handle and serves for balanced holding of the filled container when the holding device holds the container by means of the first receiving means.

The present invention furthermore proposes a combination of a flexible container having an opening comprising an opening edge, a long material according to the invention for stretching the opening edge, and a holding device according to the invention for holding the flexible container having an opening edge stretched in a dimensionally stable manner.

c) EMBODIMENTS

Figure 2:
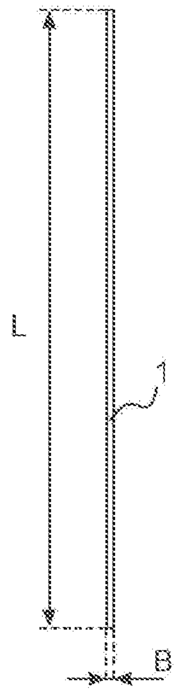
Figure 3:
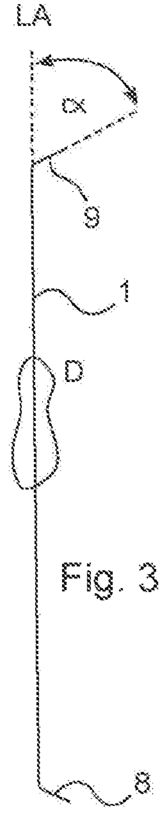
Figure 4:
Figure 5:
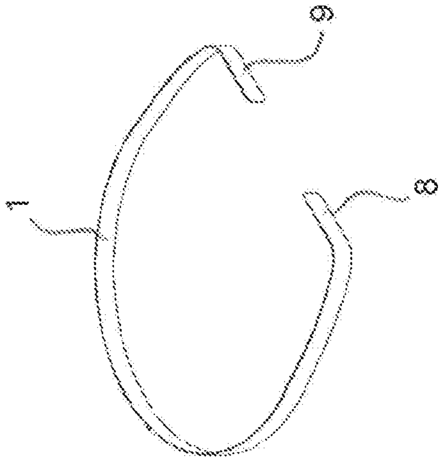
Figure 6:
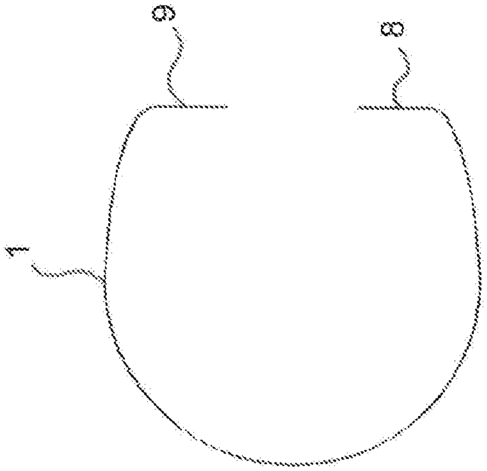
Figure 7:
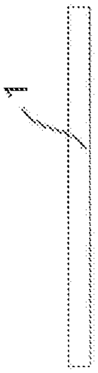
Figure 8:
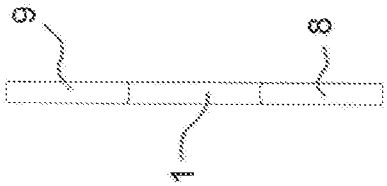
Figure 9:
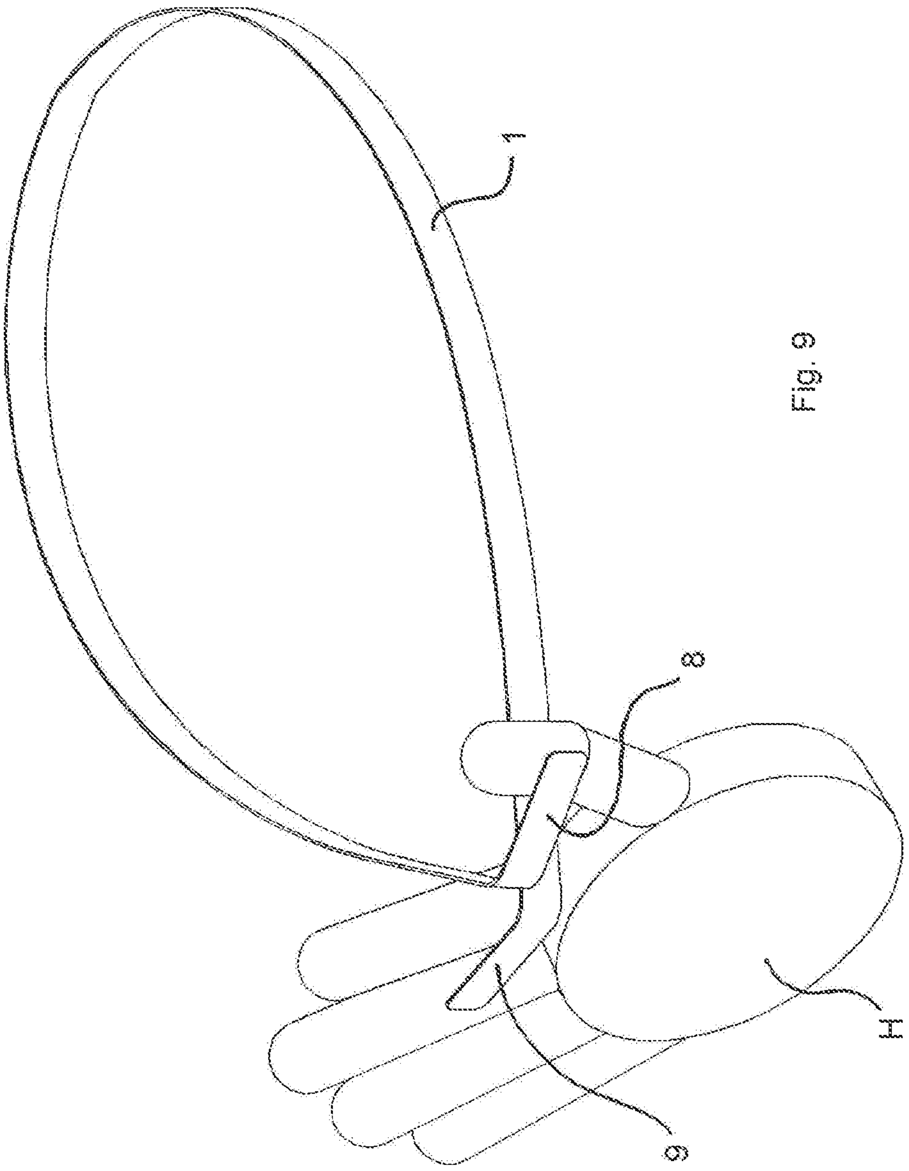
Figure 10:
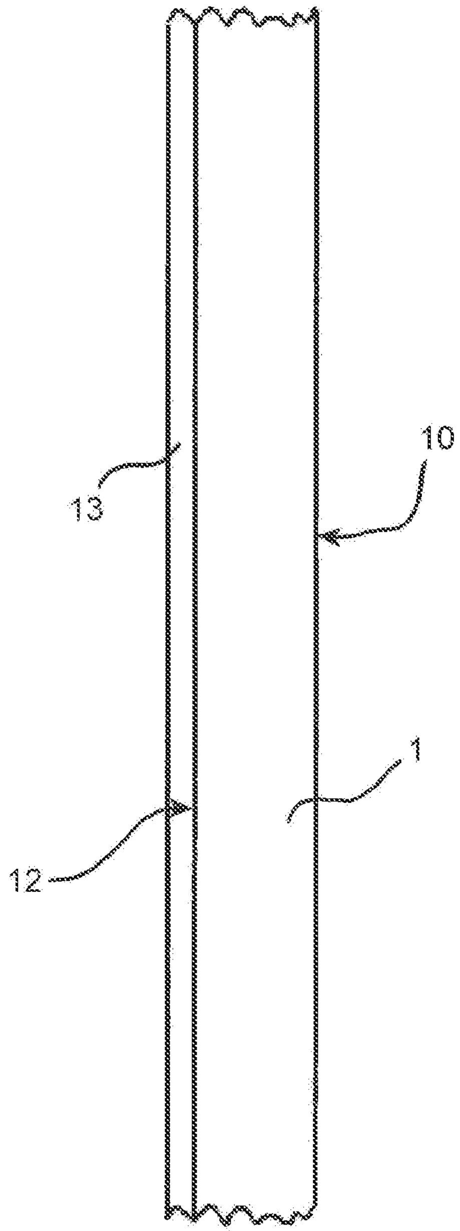
Figure 11:
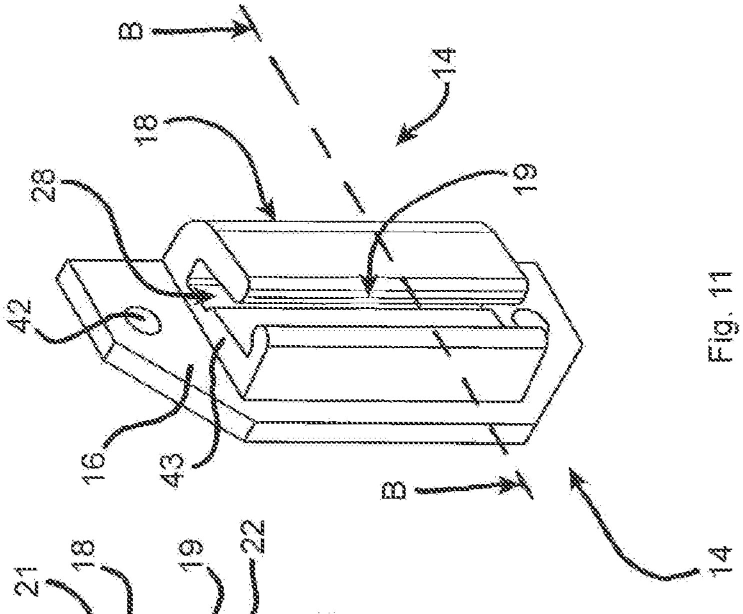
Figure 12:
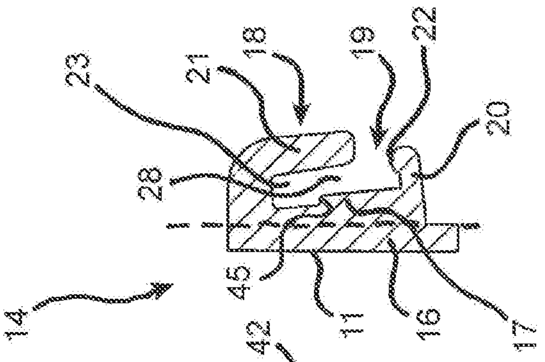
Figure 13:
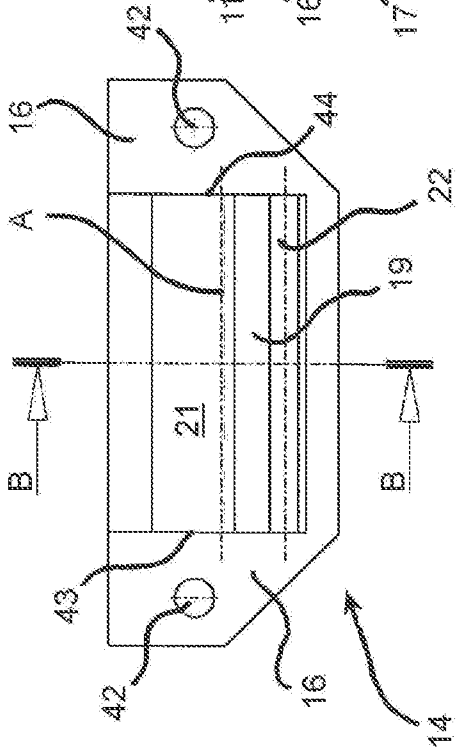
Figure 14:
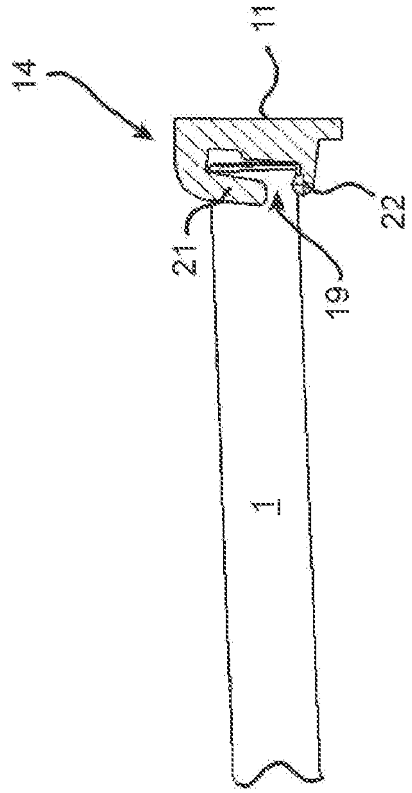
Figure 15:
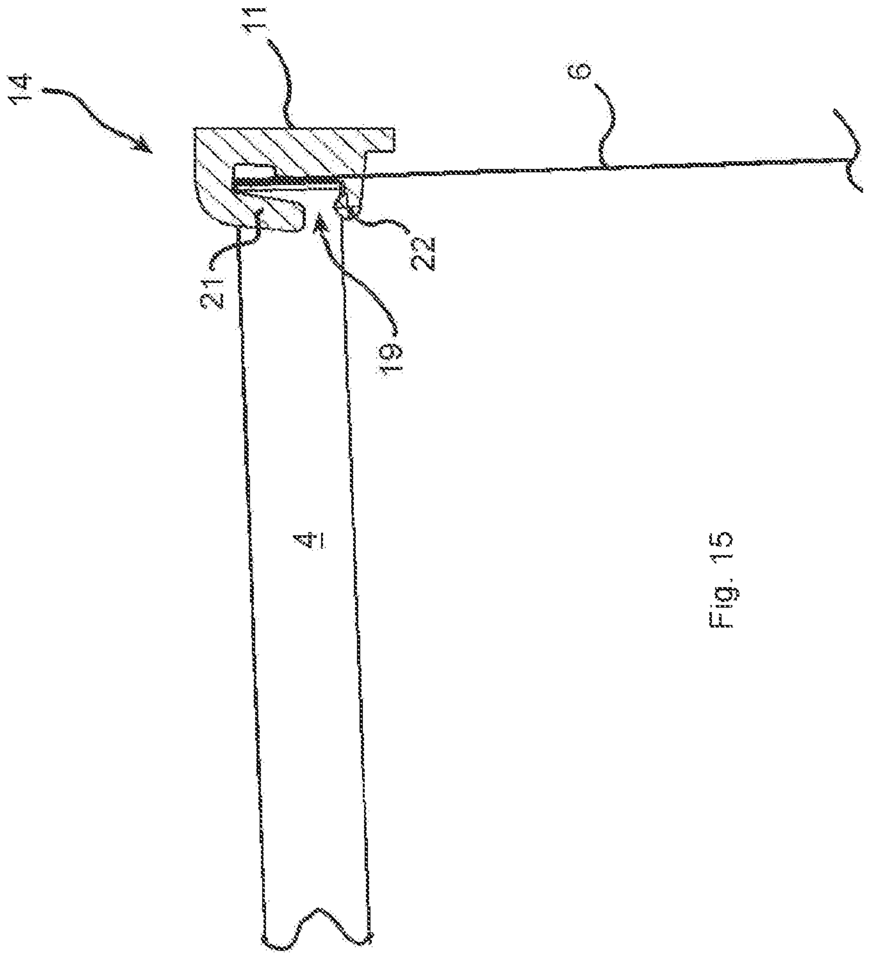
Figure 16:
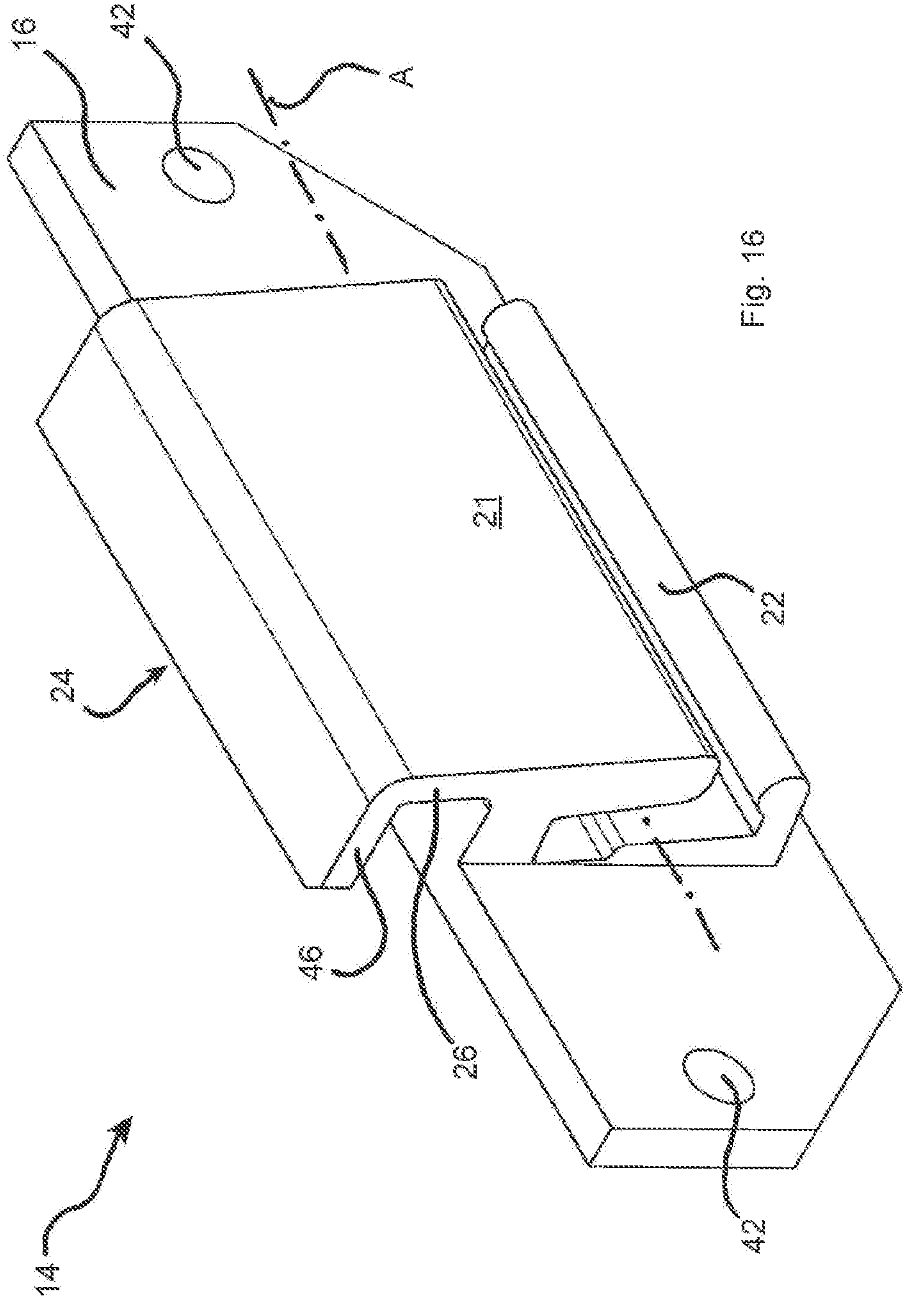
Figure 17:
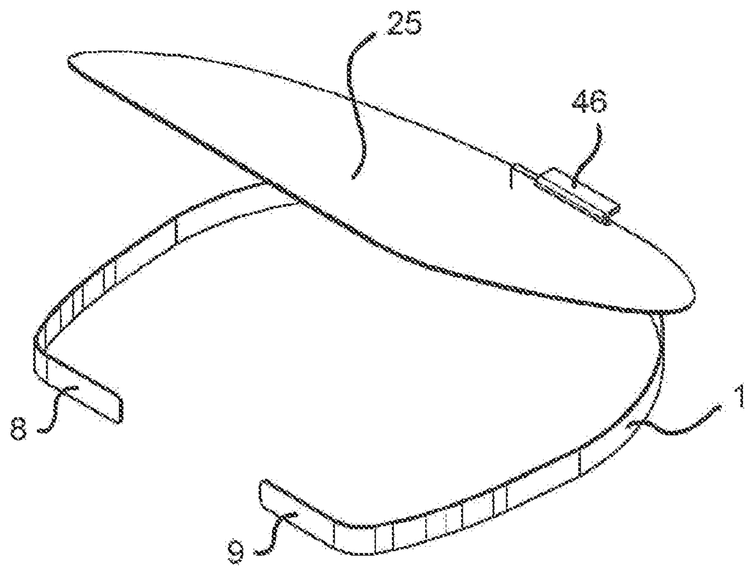
Figure 18:
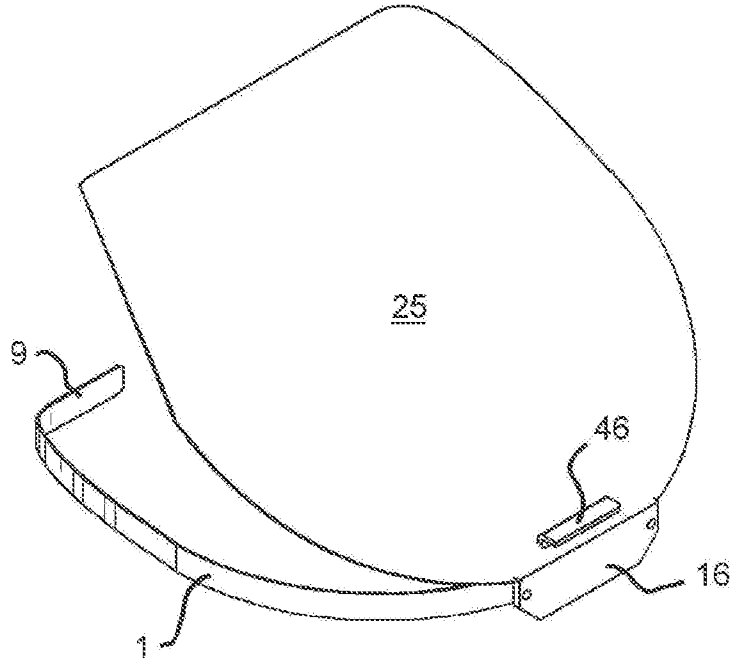
Figure 20:
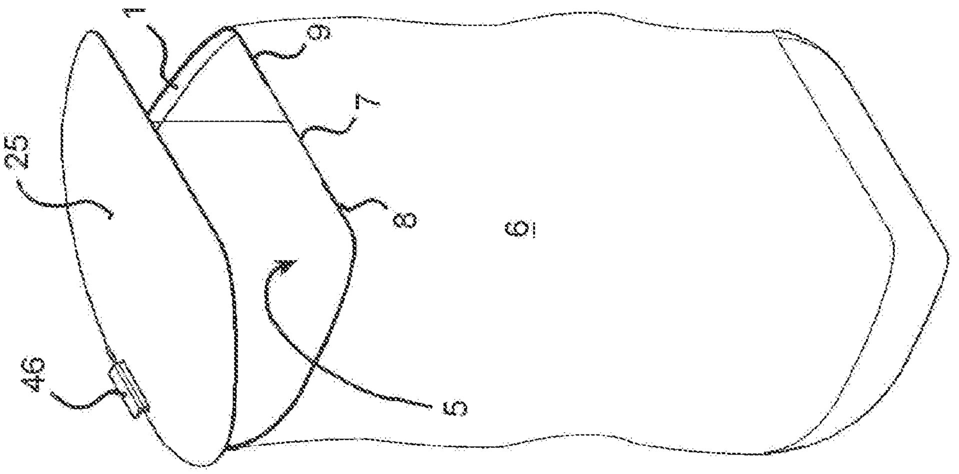
Figure 19:
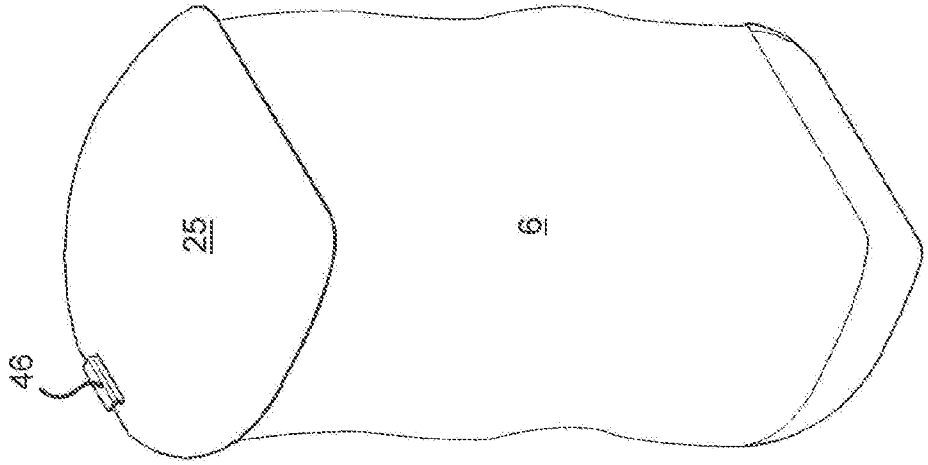
Figure 21:
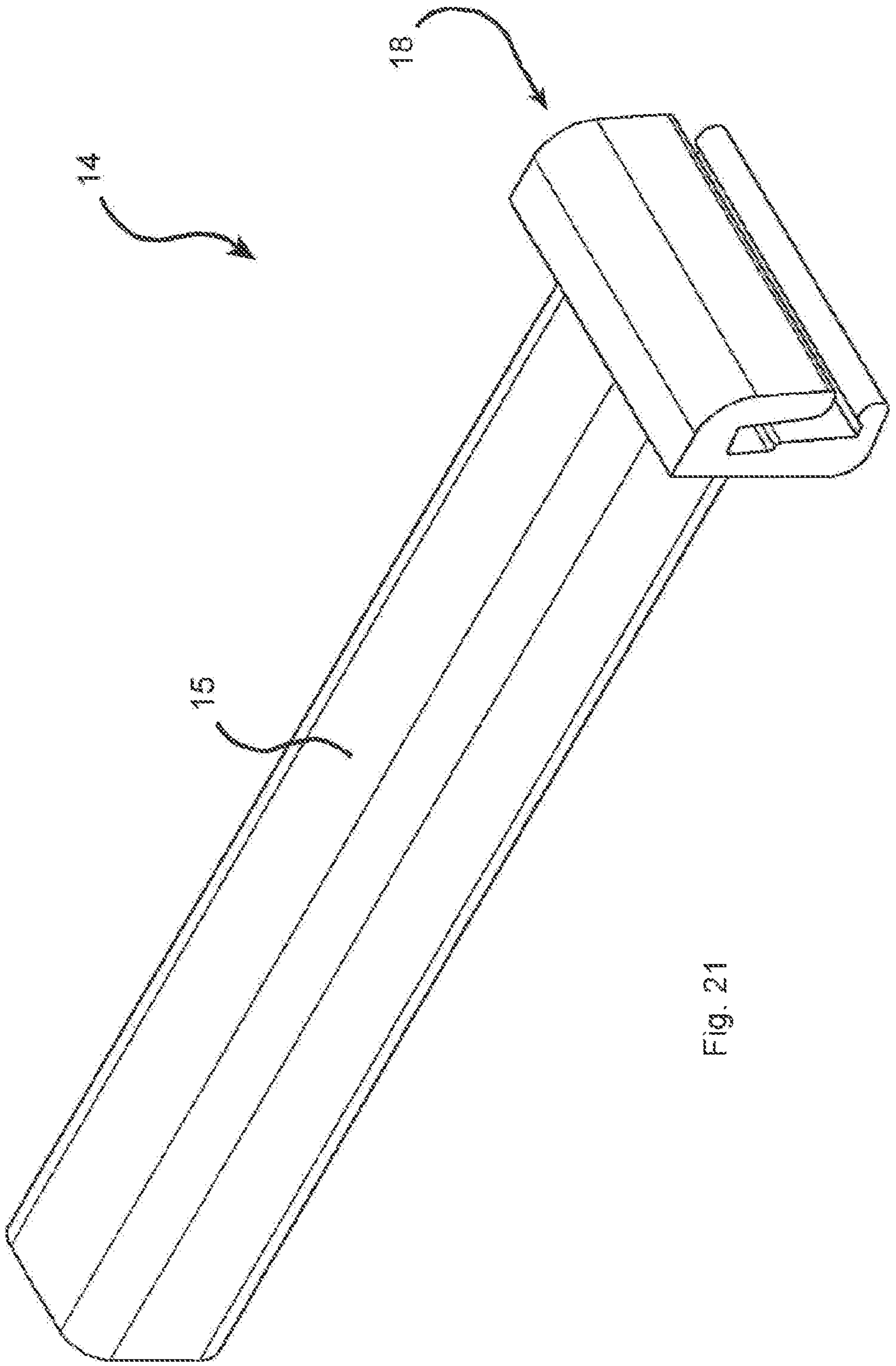
Figure 22:
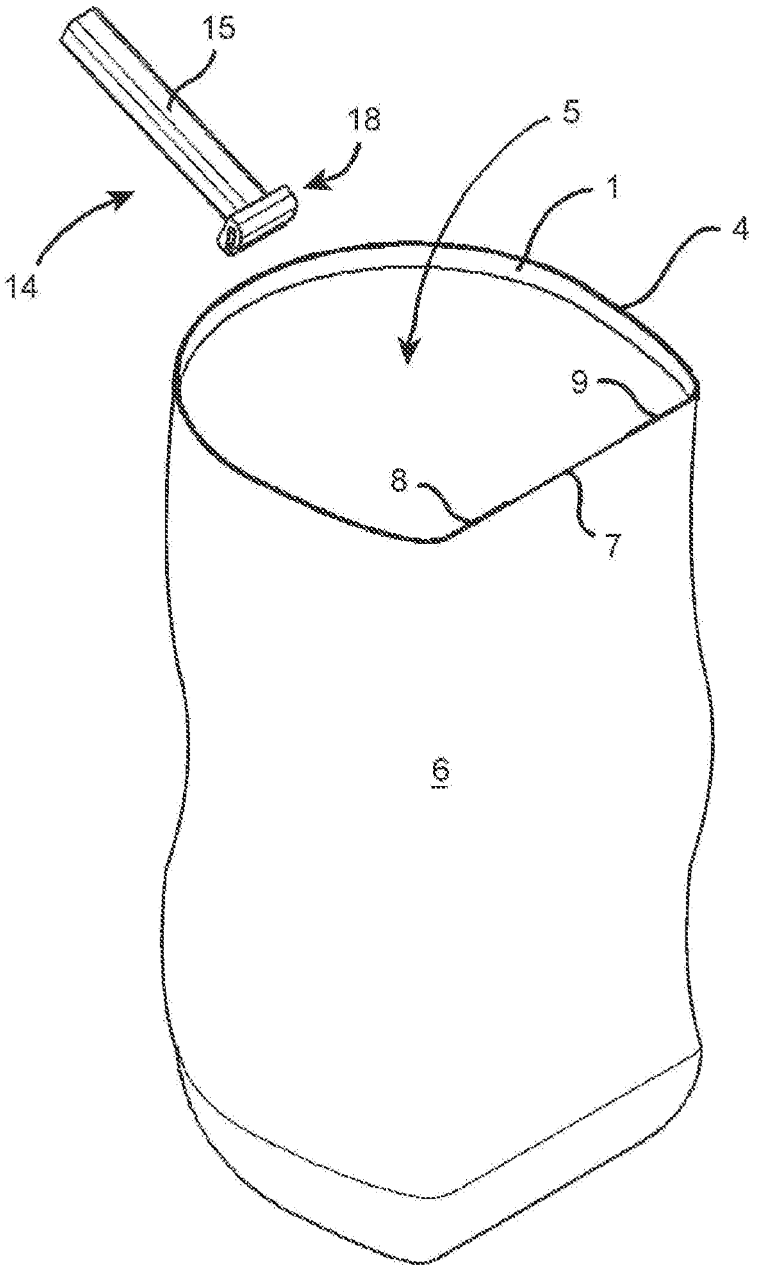
Figure 23:
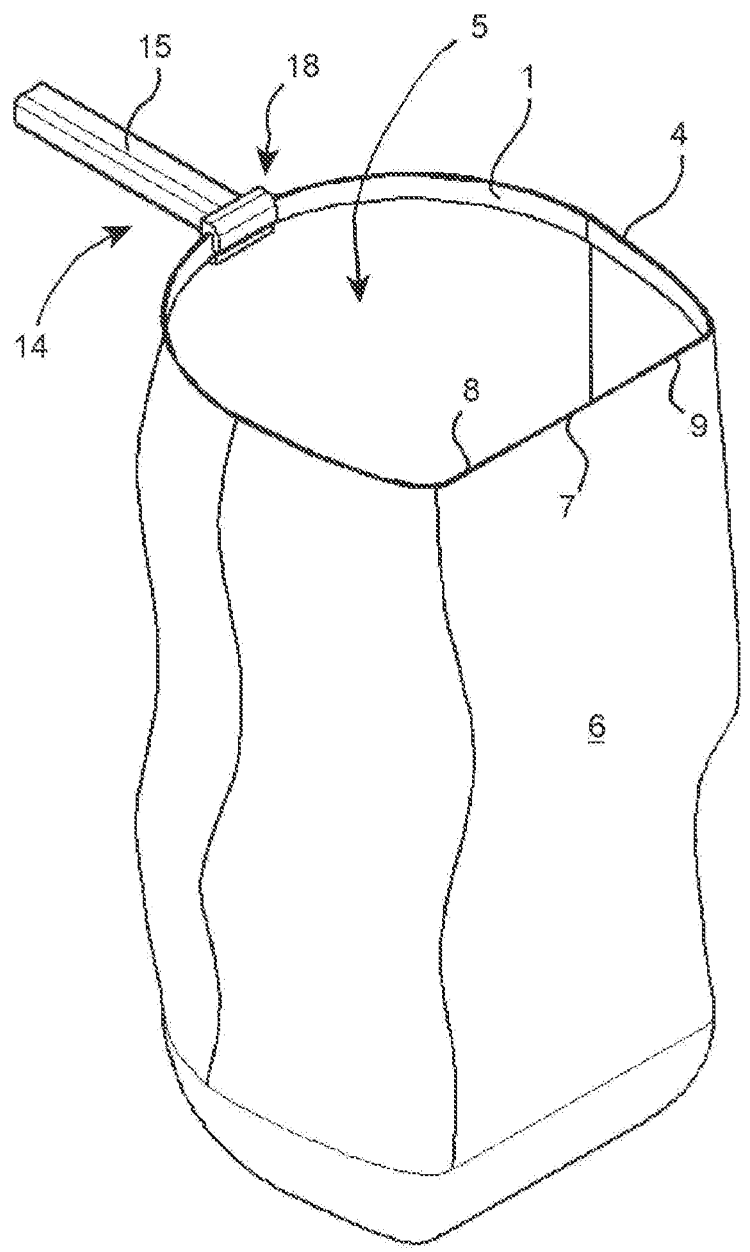
Figure 24:
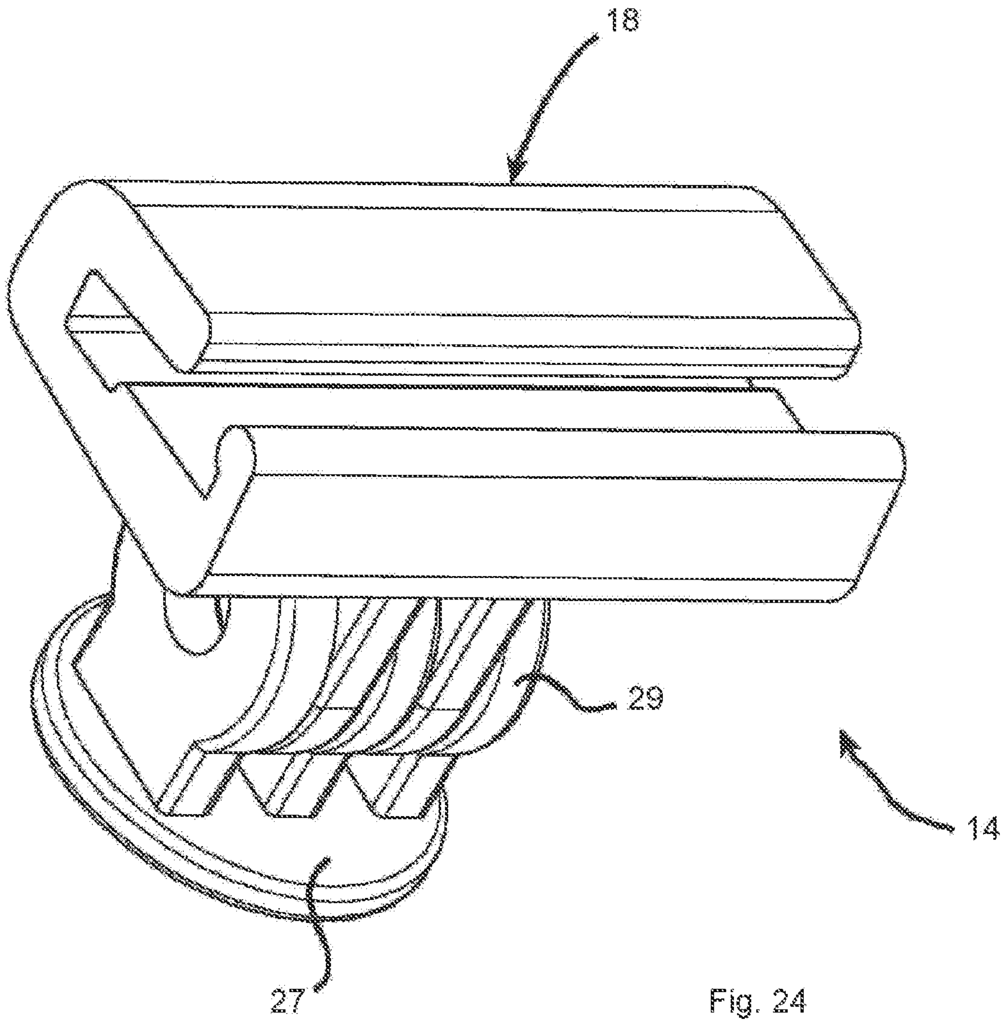
Figure 25:
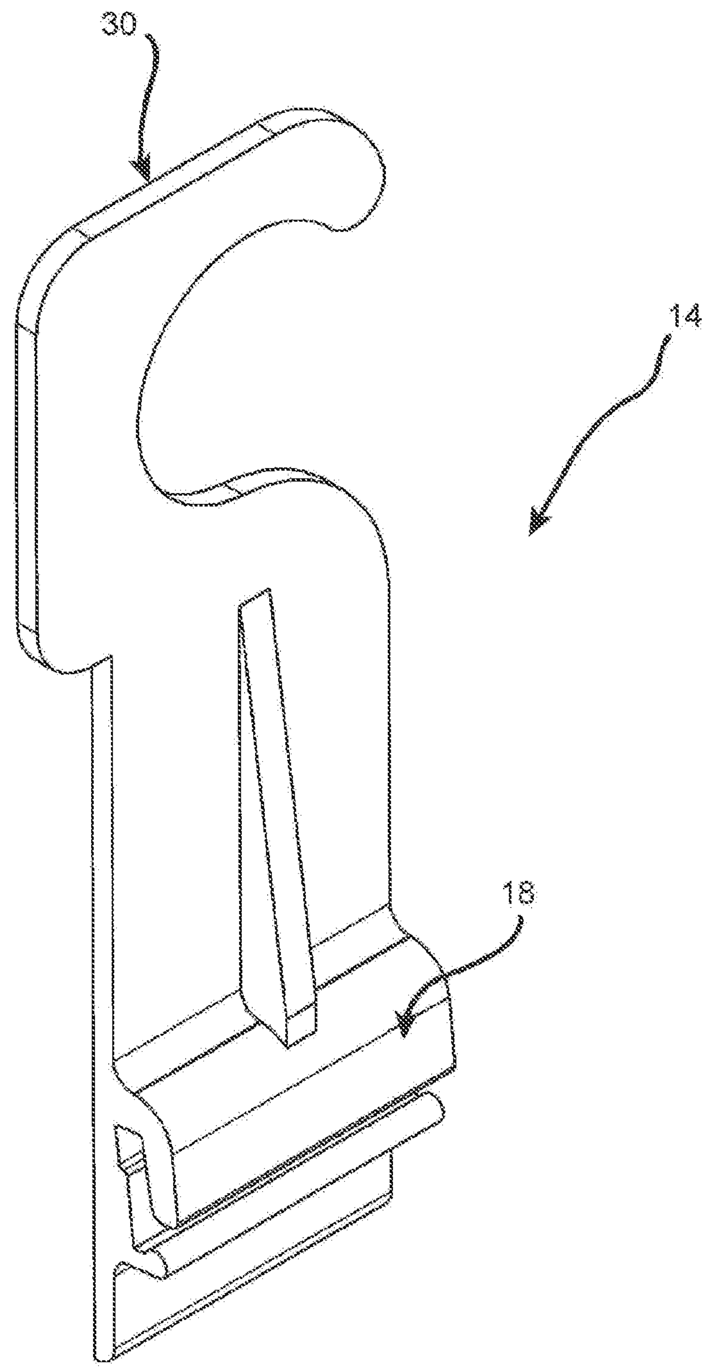
Figure 26:
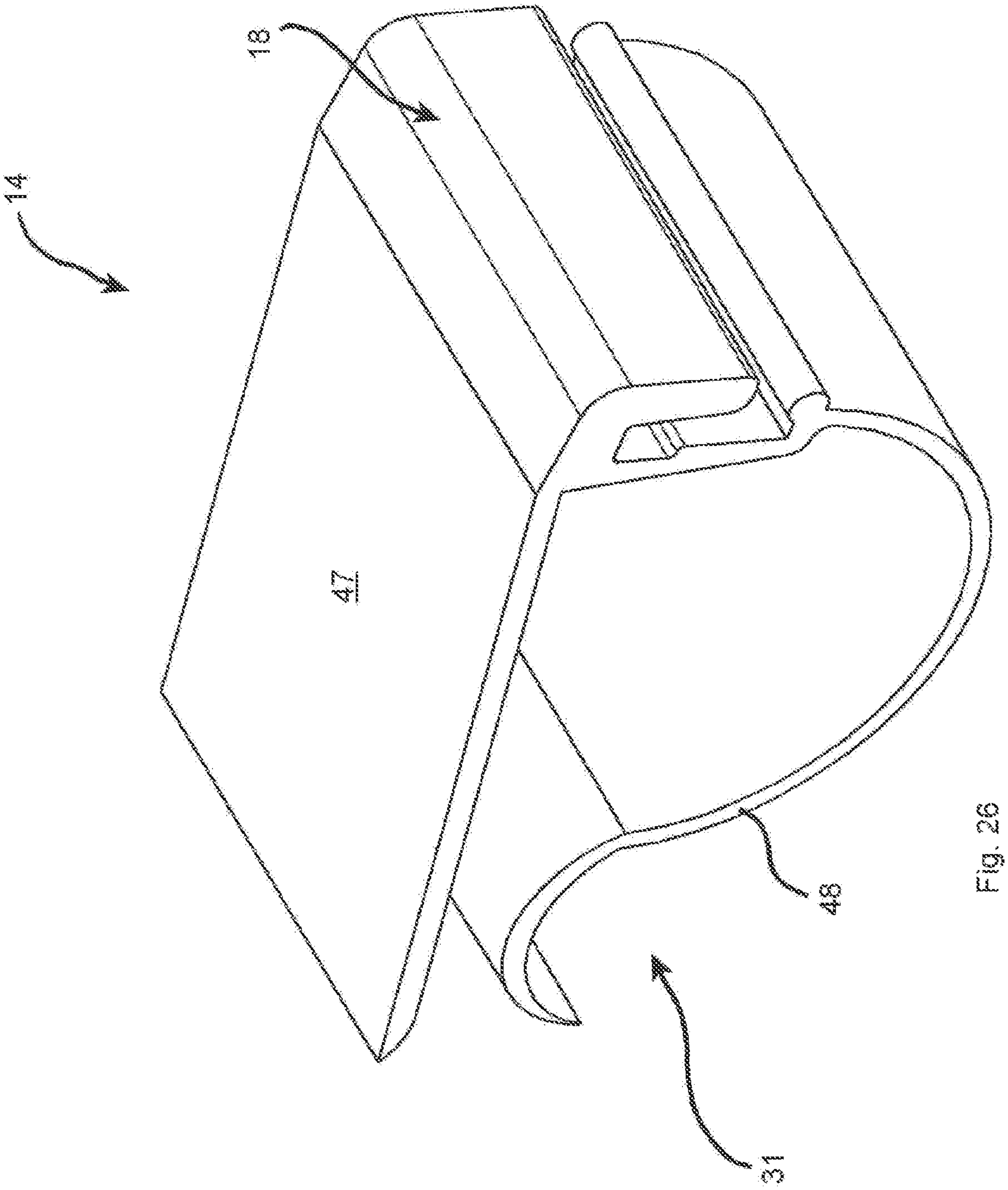
Figure 27:
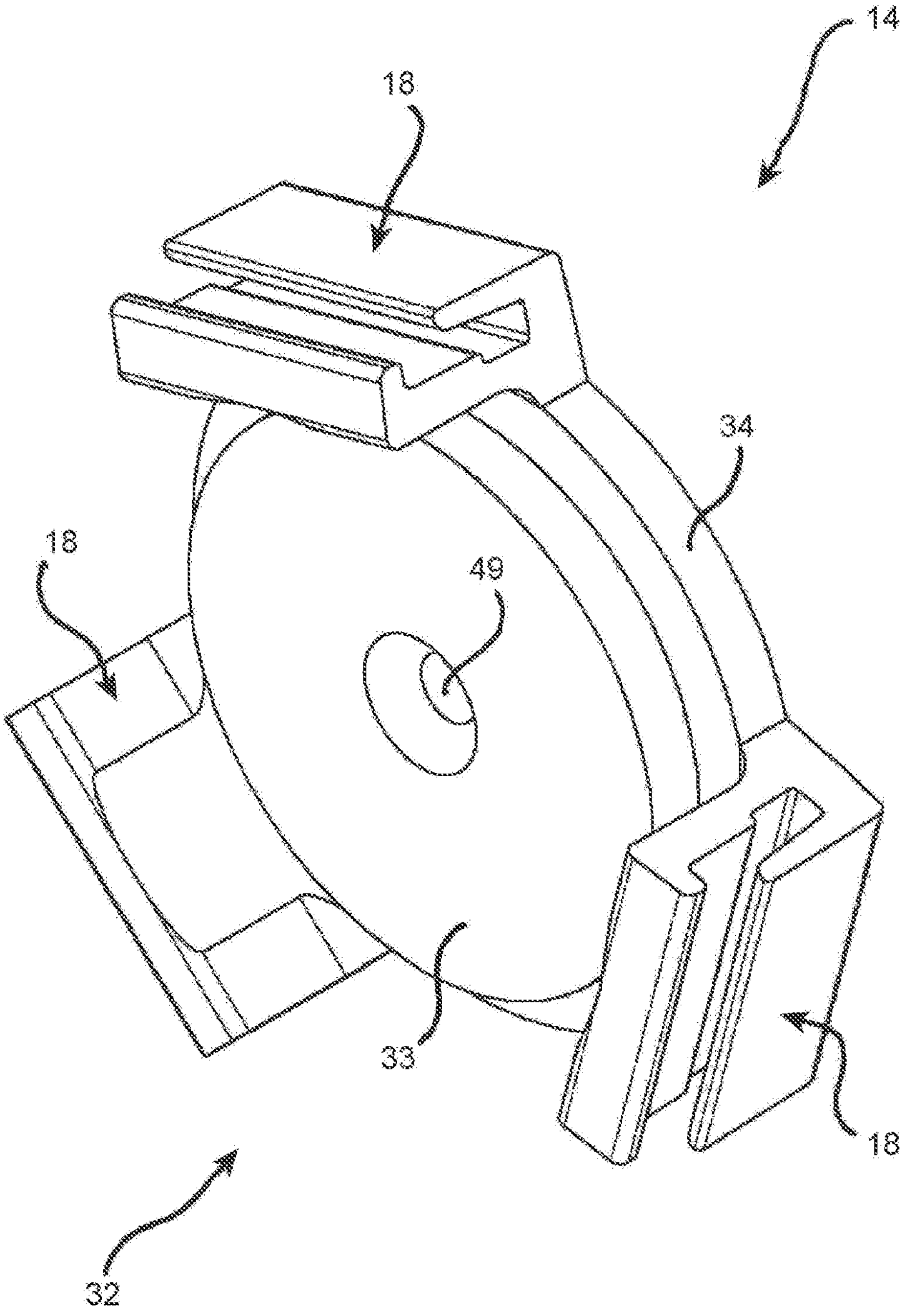
Figure 28:
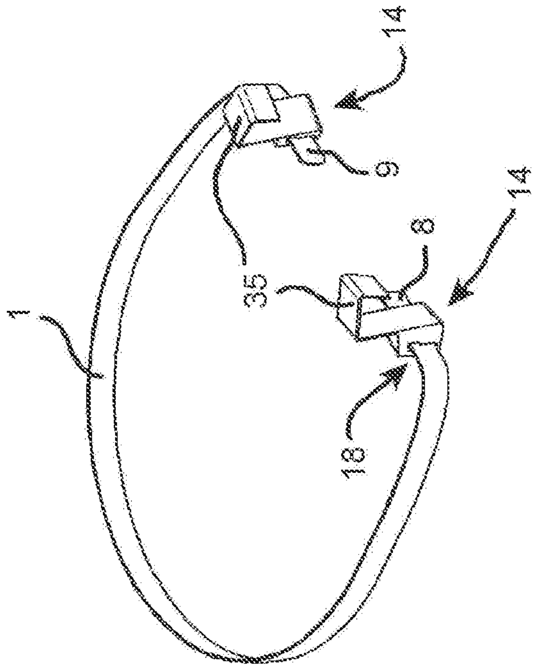
Figure 29:
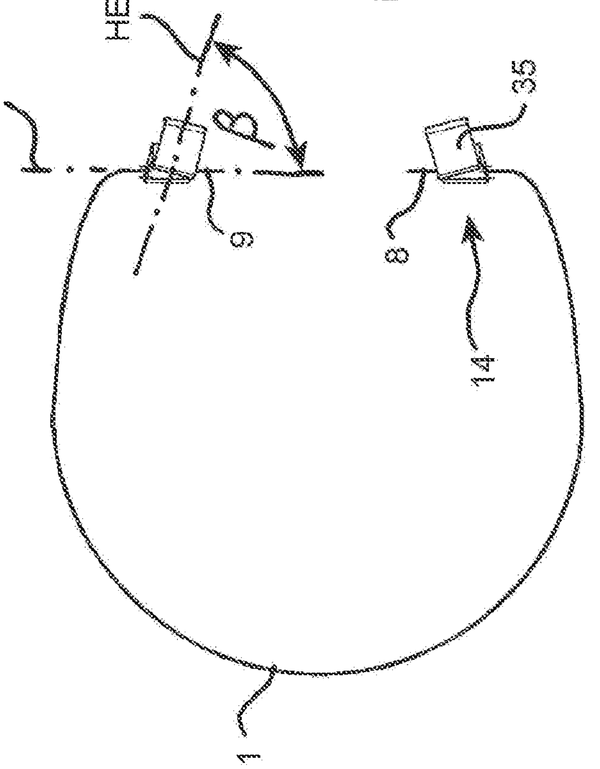
Figure 30:
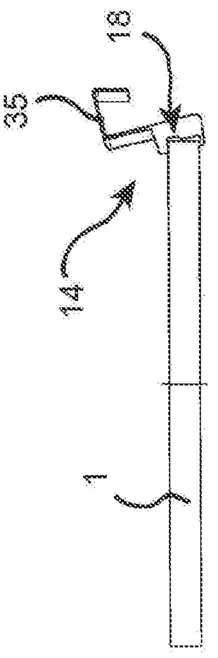
Figure 31:
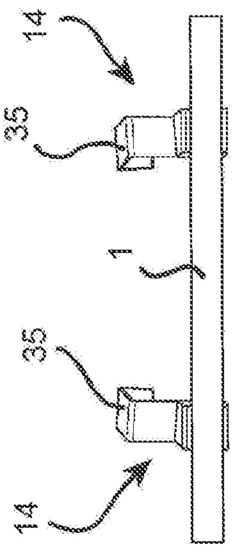
Figure 32:
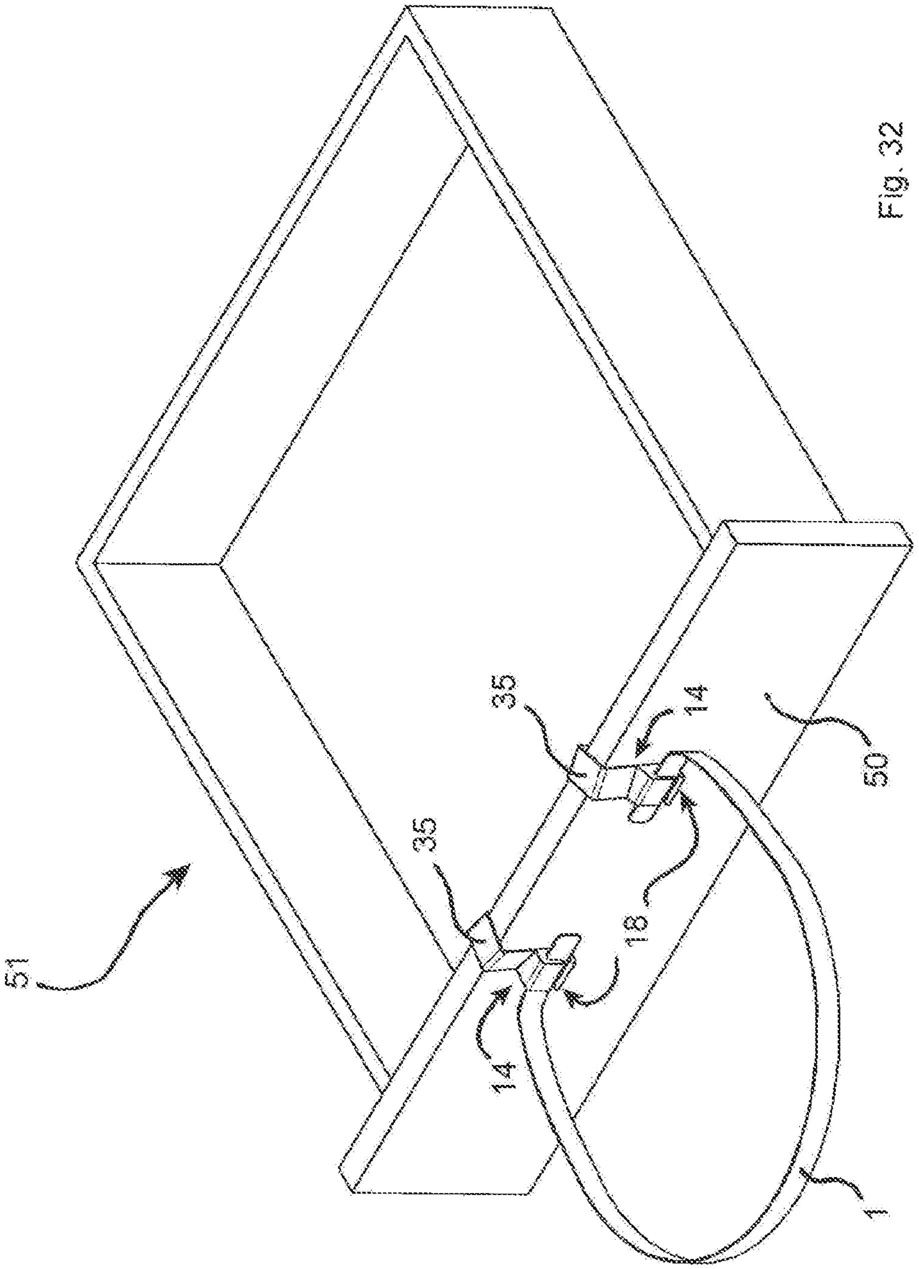
Figure 33:
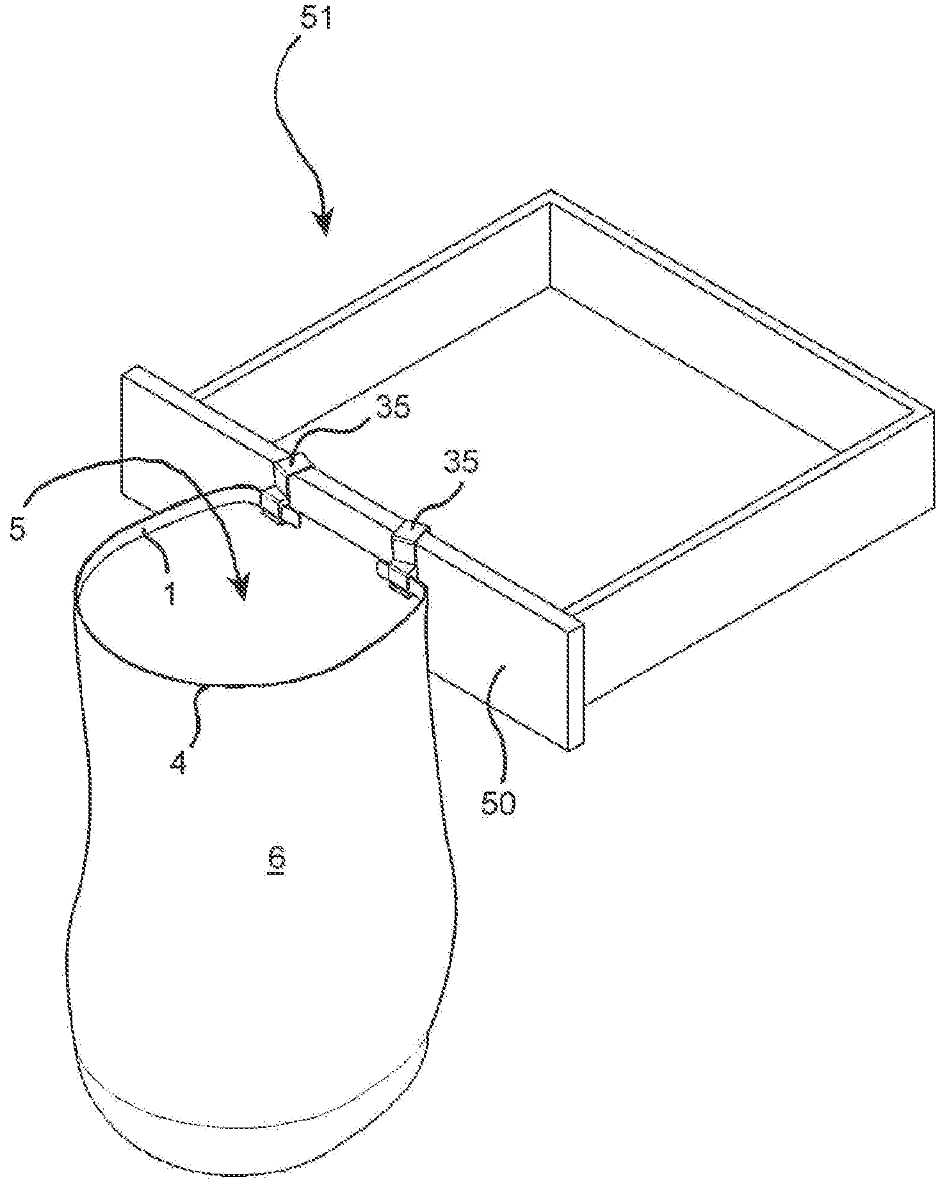
Figure 34:
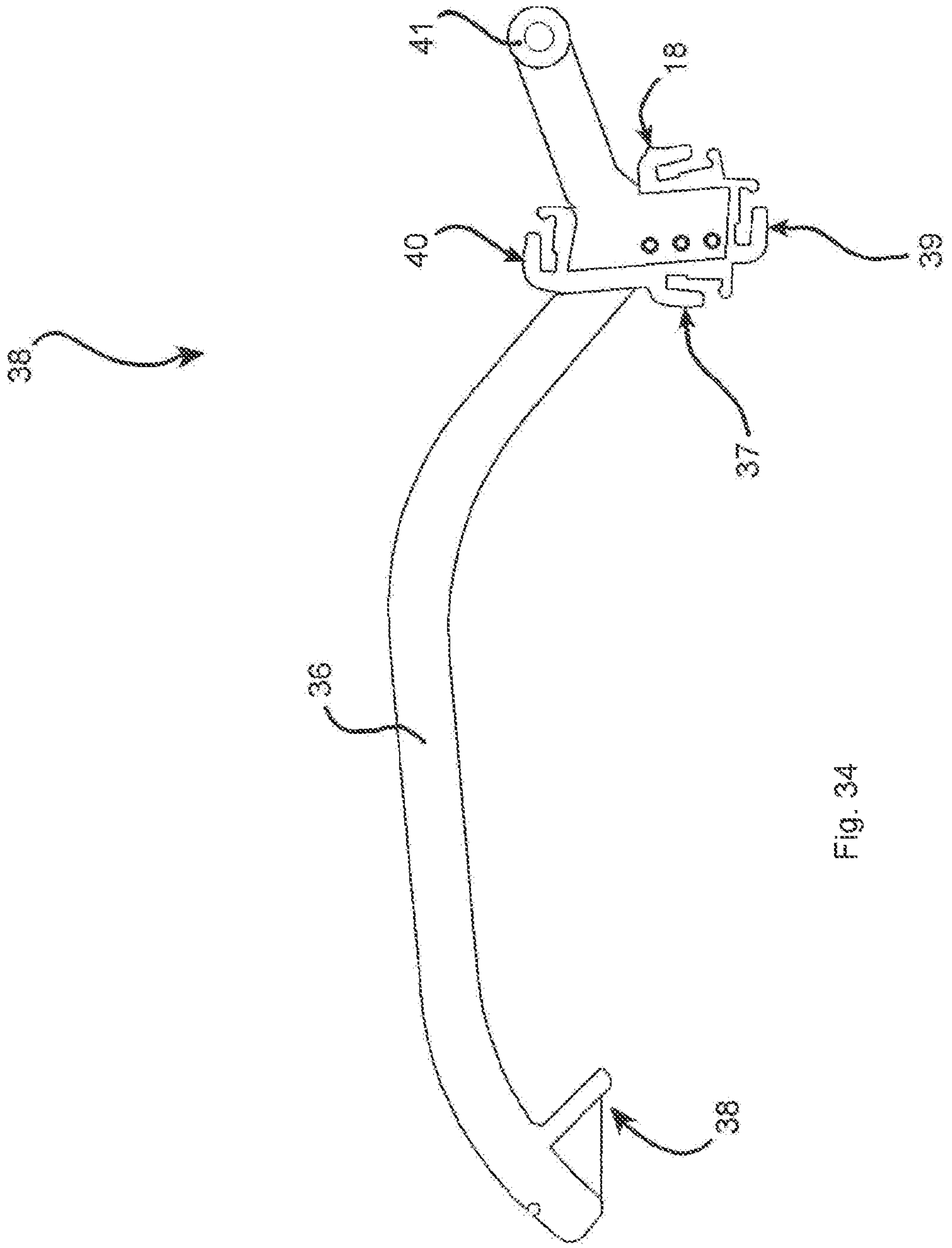
Figure 35:
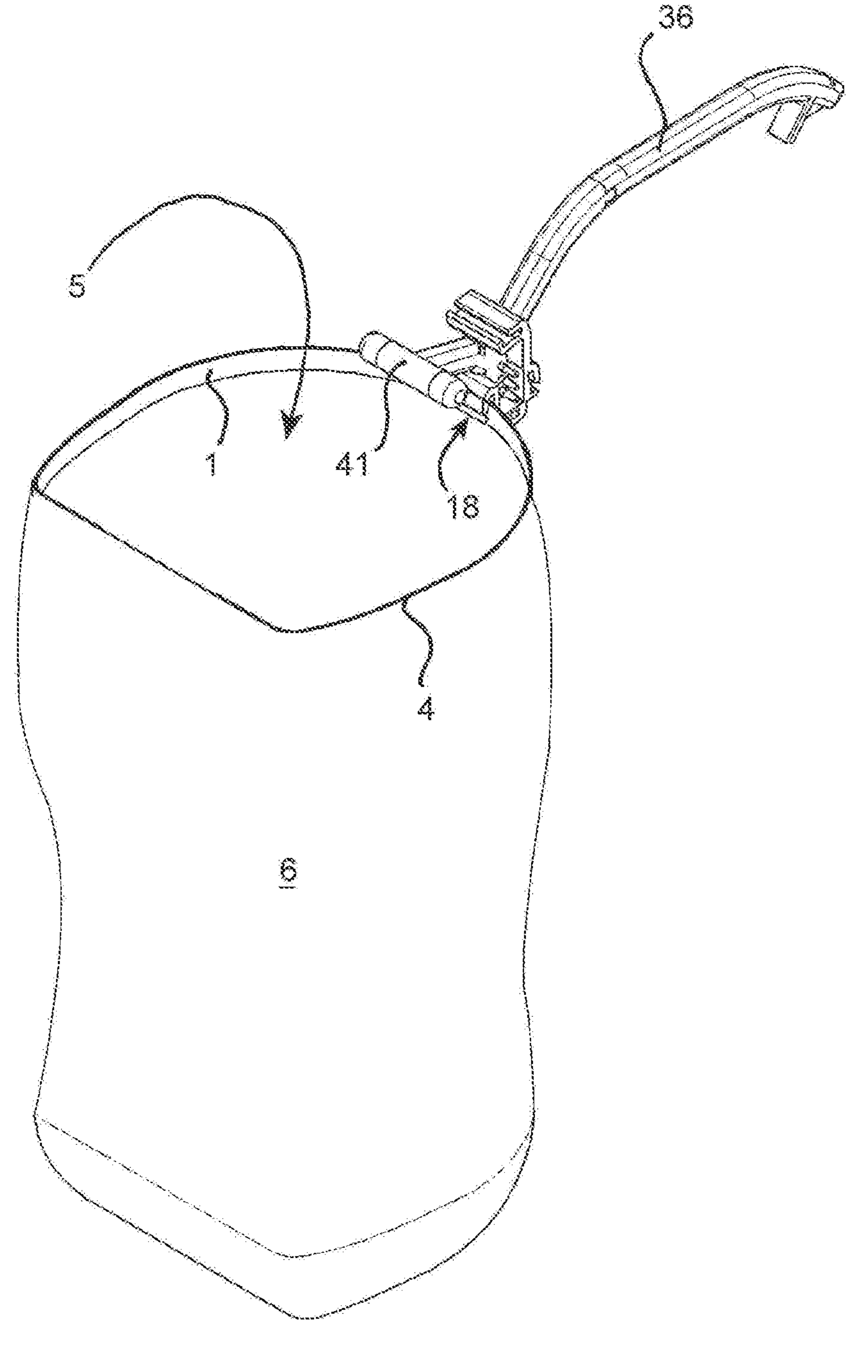
Figure 36:
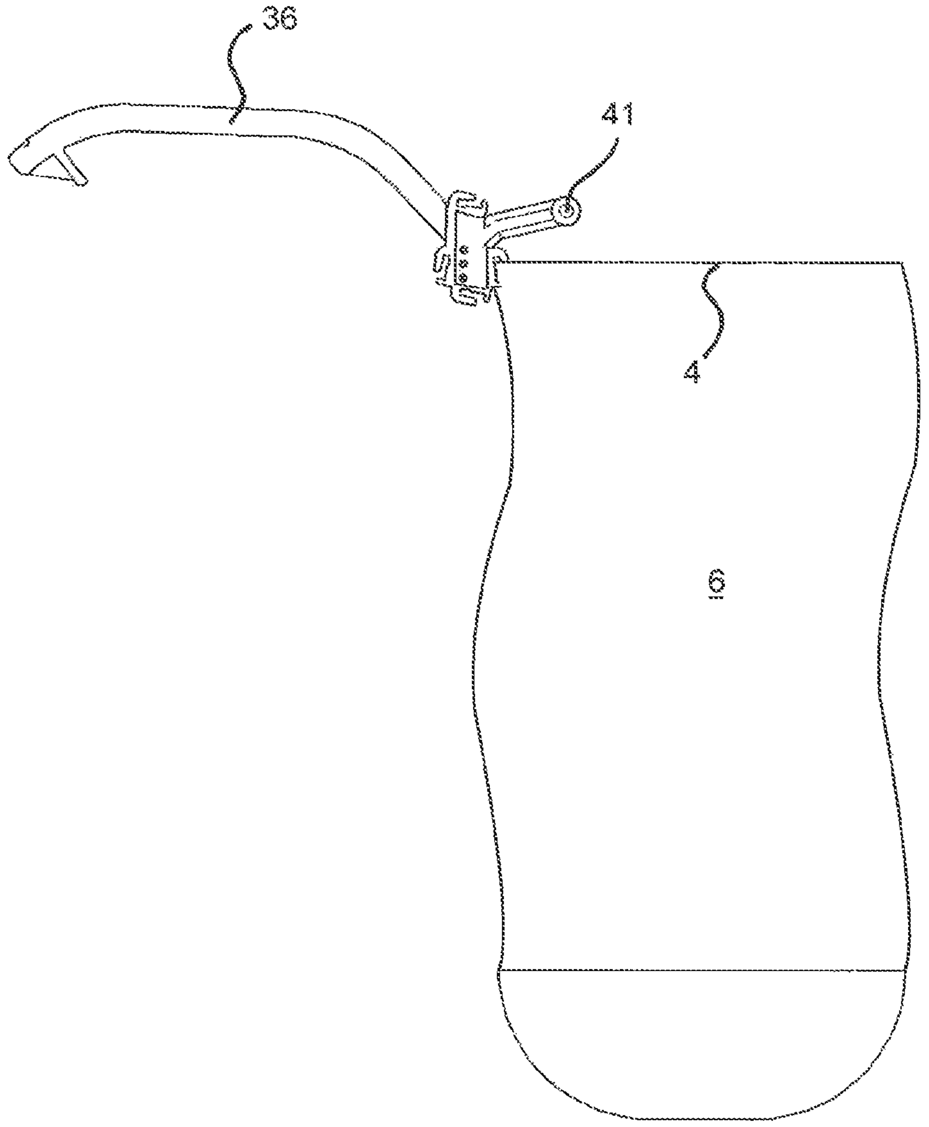
Figure 37:
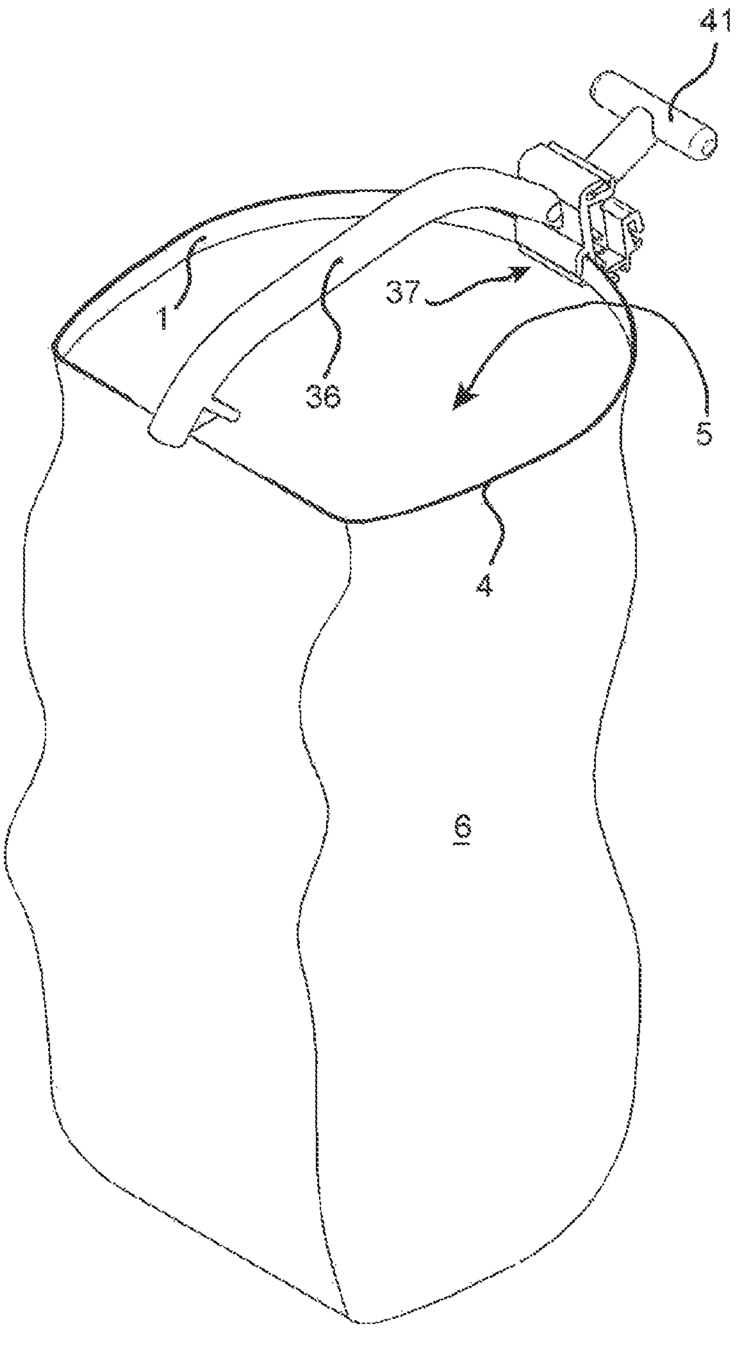
Figure 38:
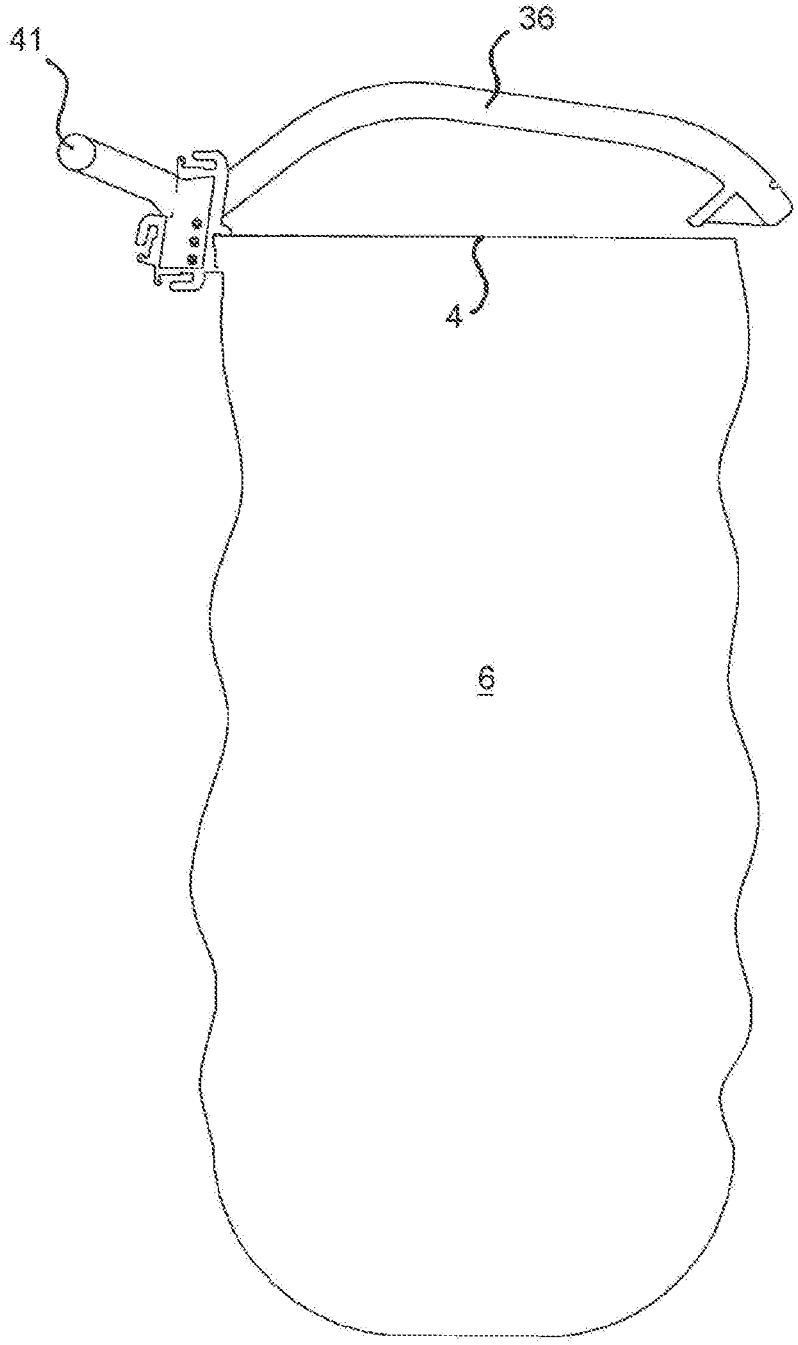
Figure 39:
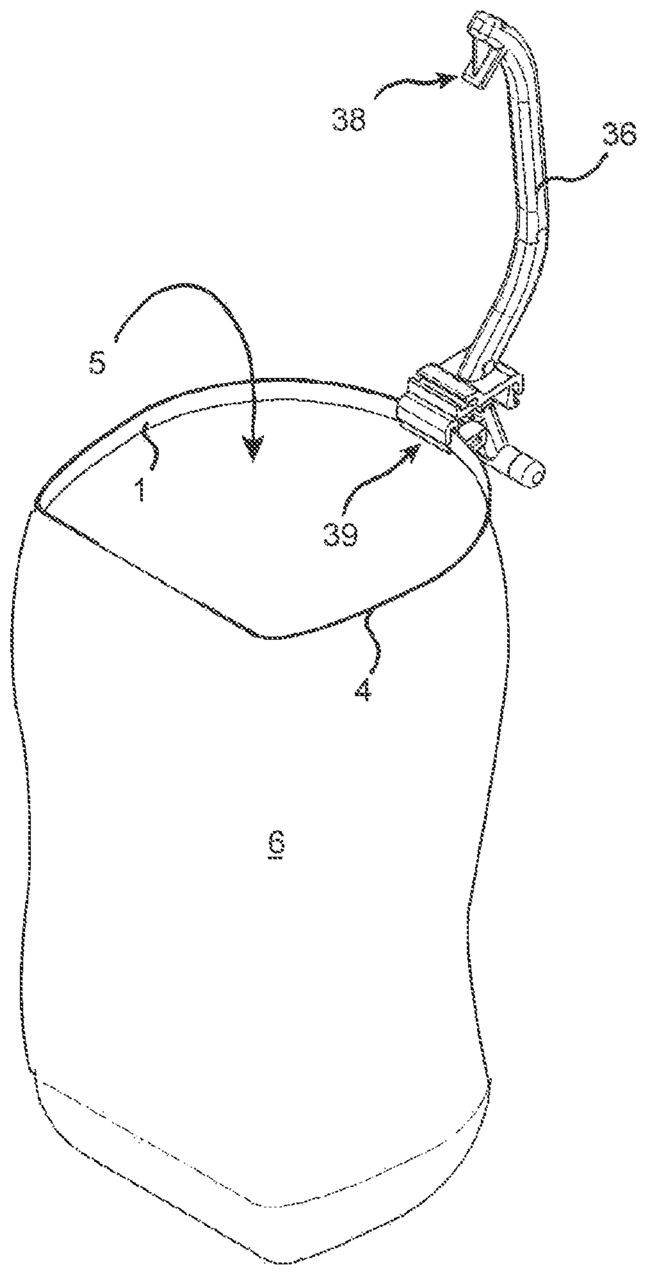
Figure 40:
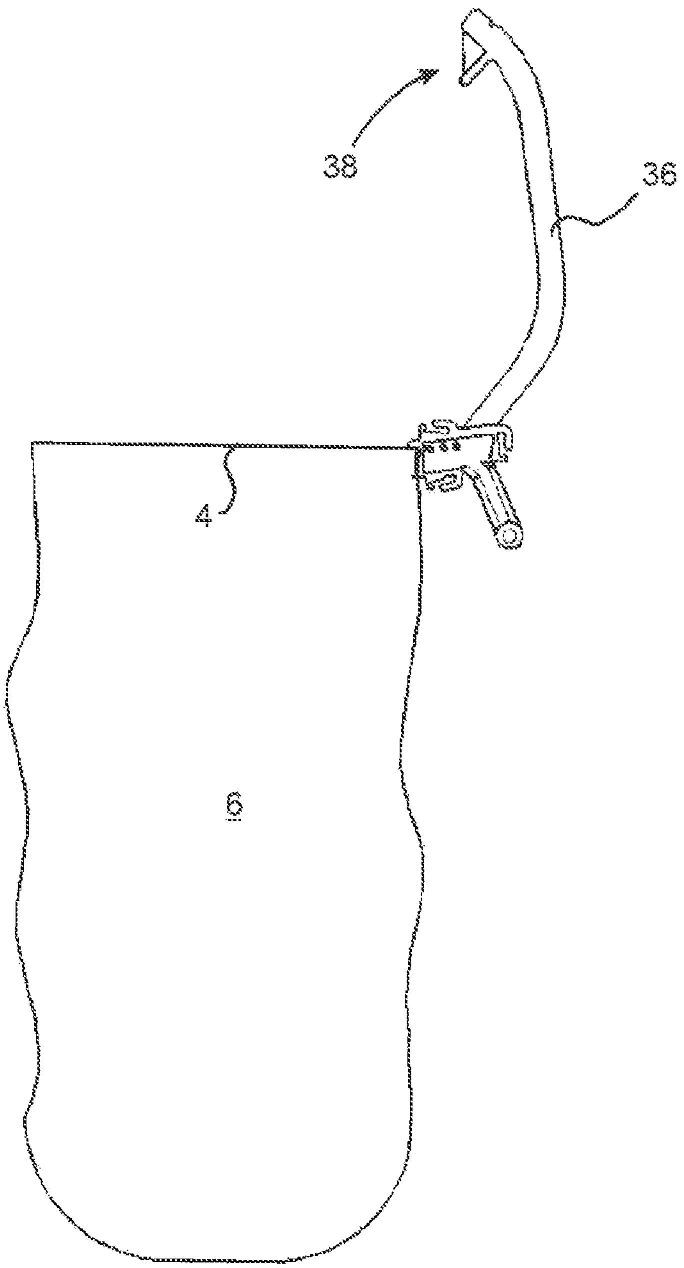
Figure 41:
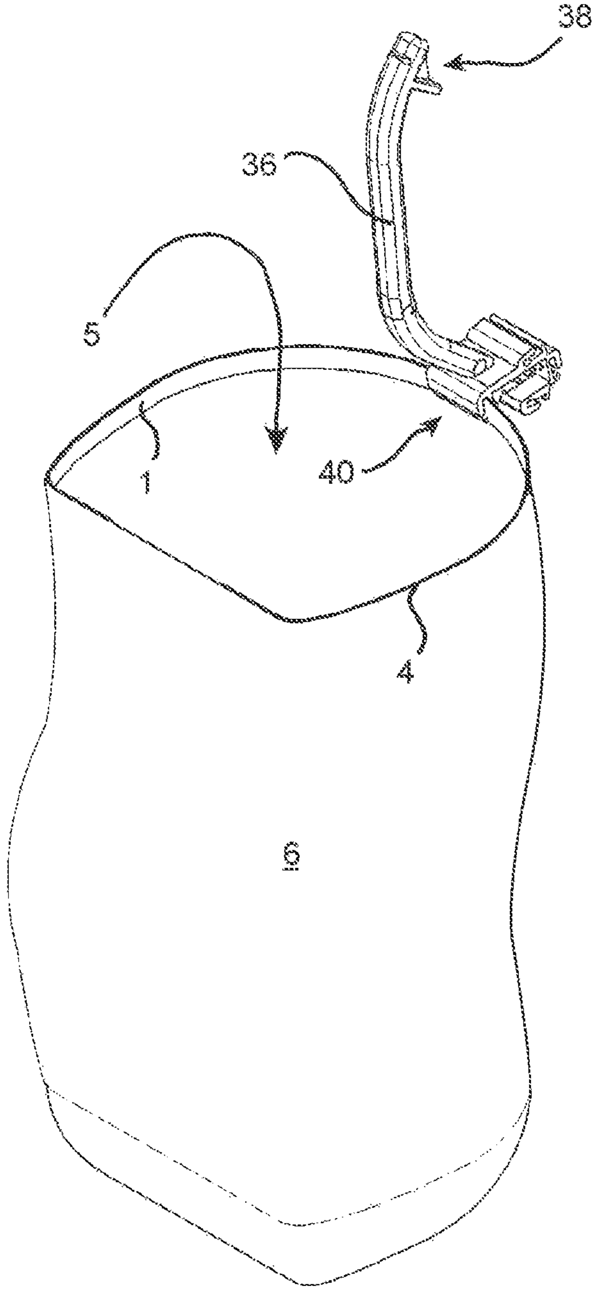
Figure 42:
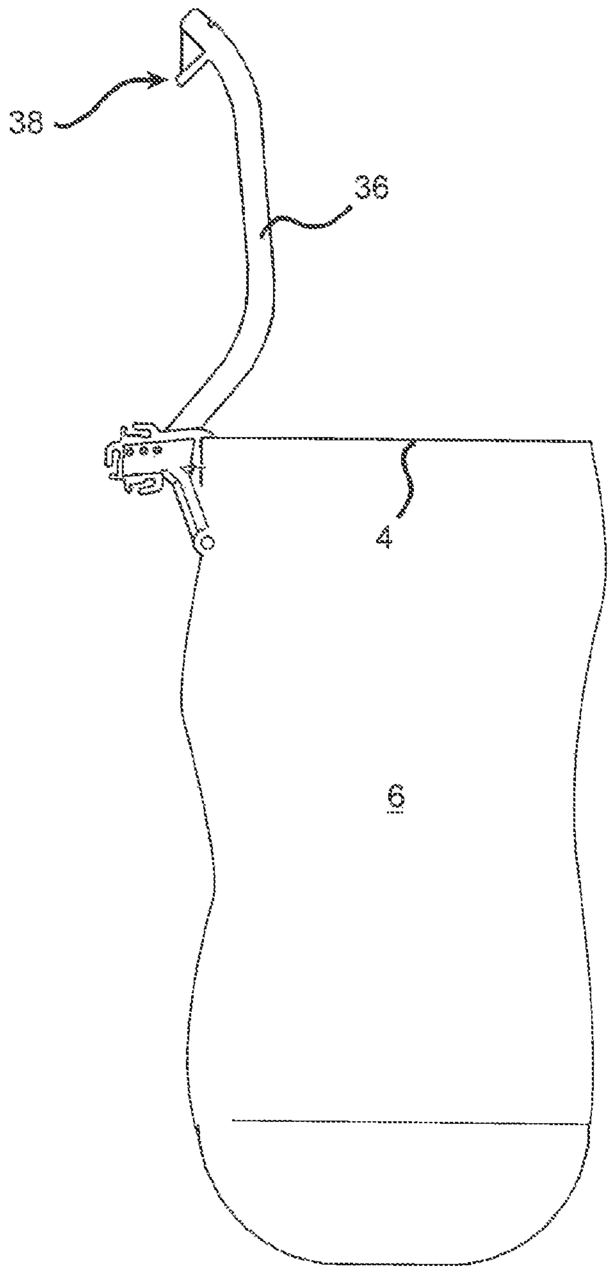
Figure 43:
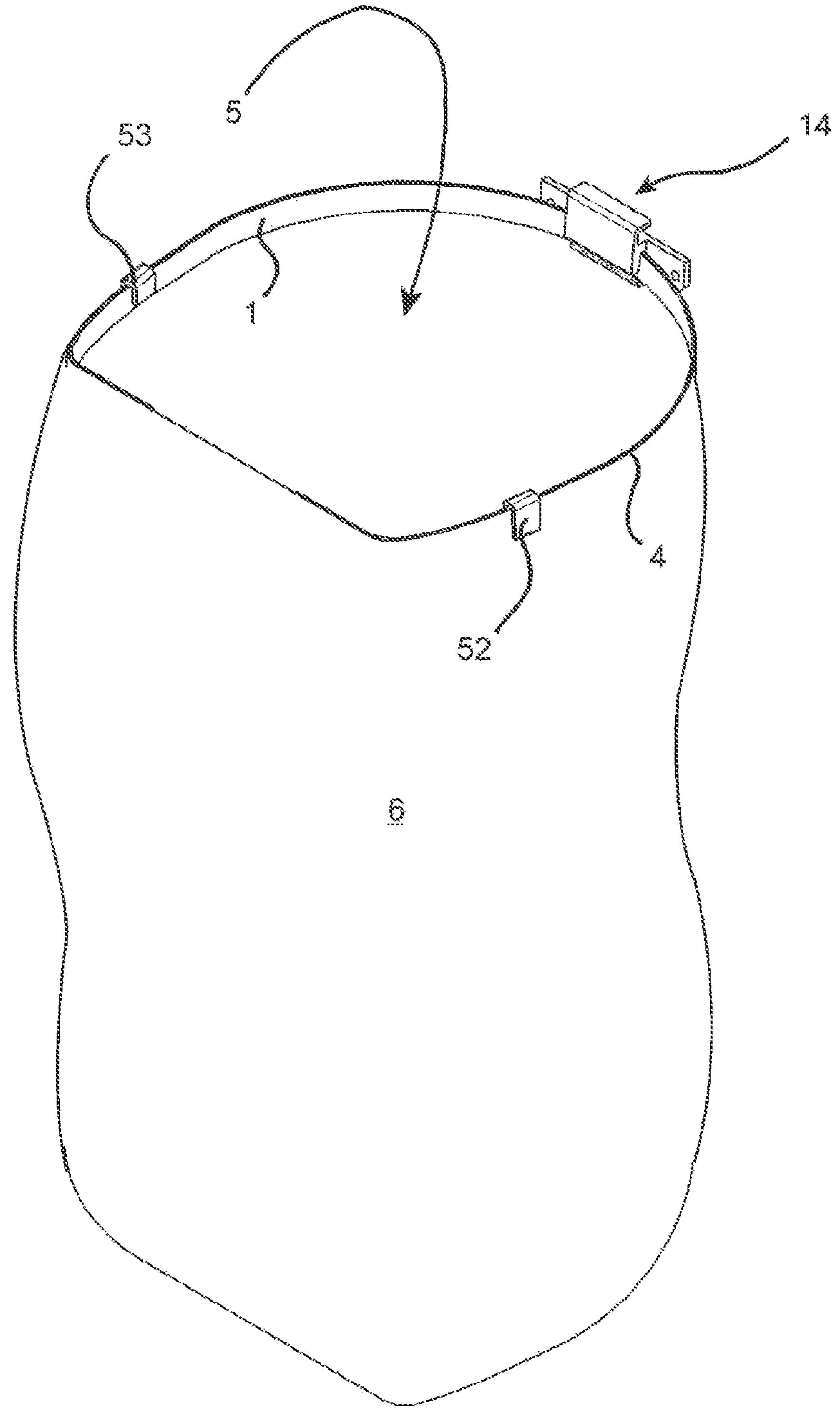
Figure 44:
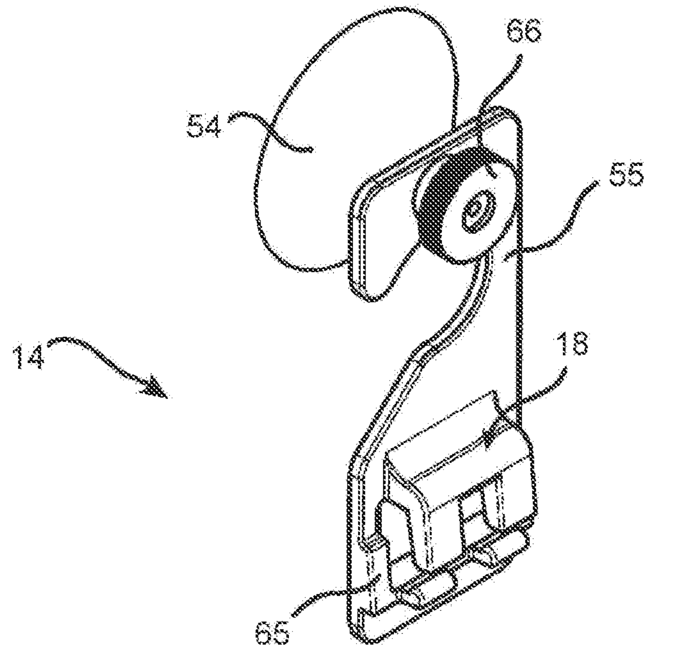
Figure 45:
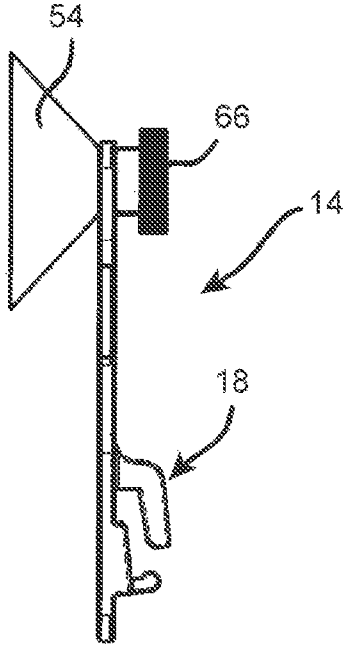
Figure 46:
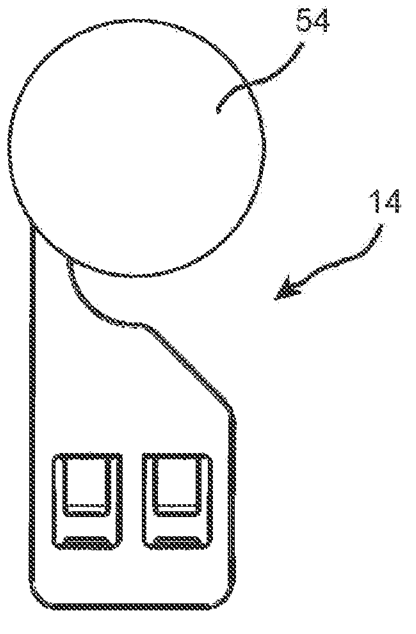
Figure 47:
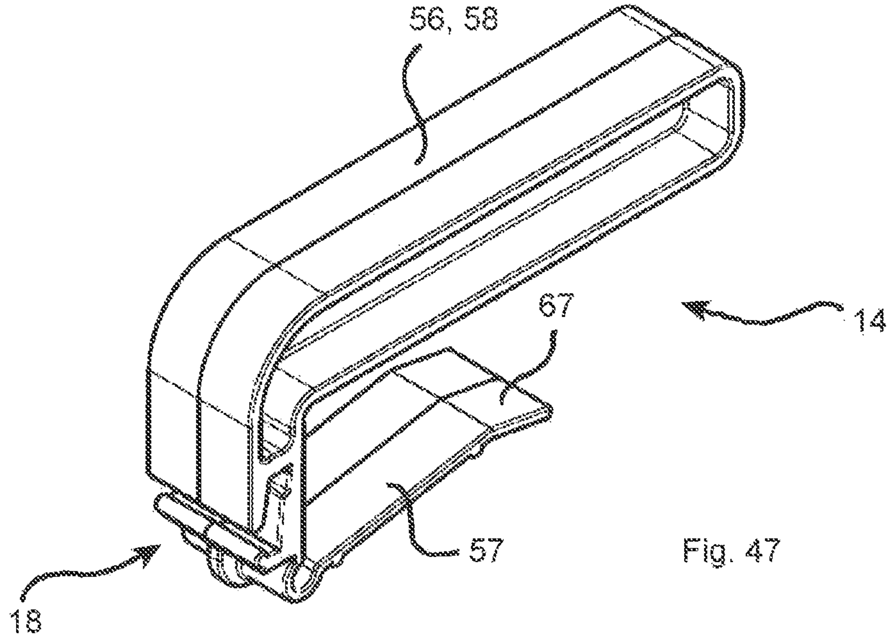
Figure 48:
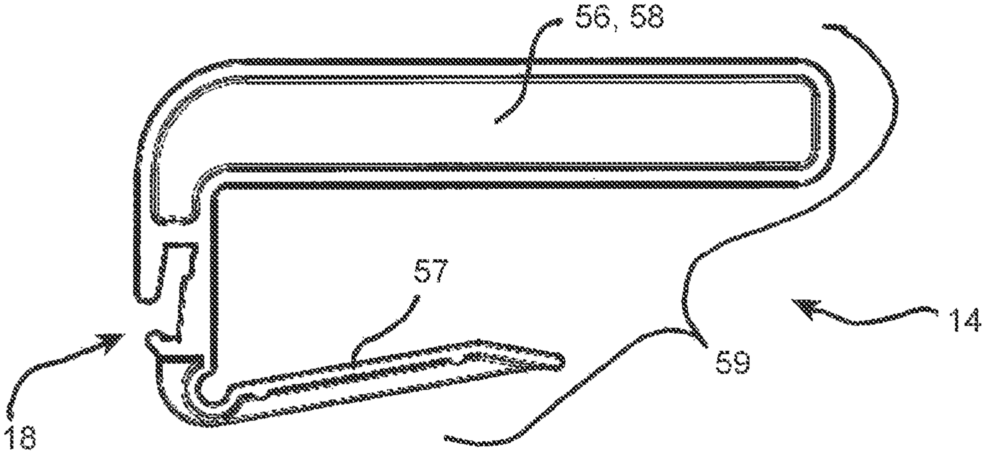
Figure 49:
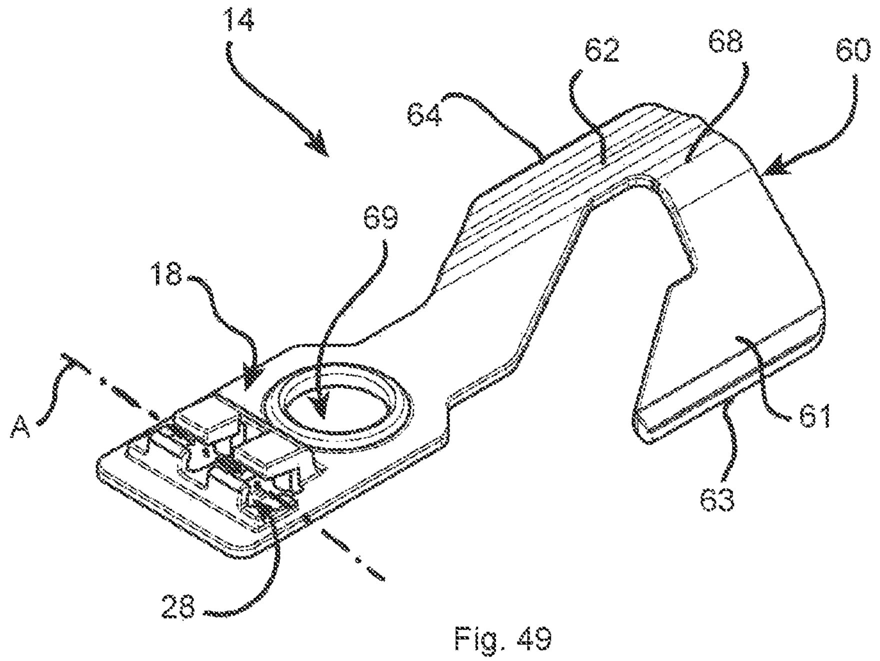
Figures 50, 51, 52:
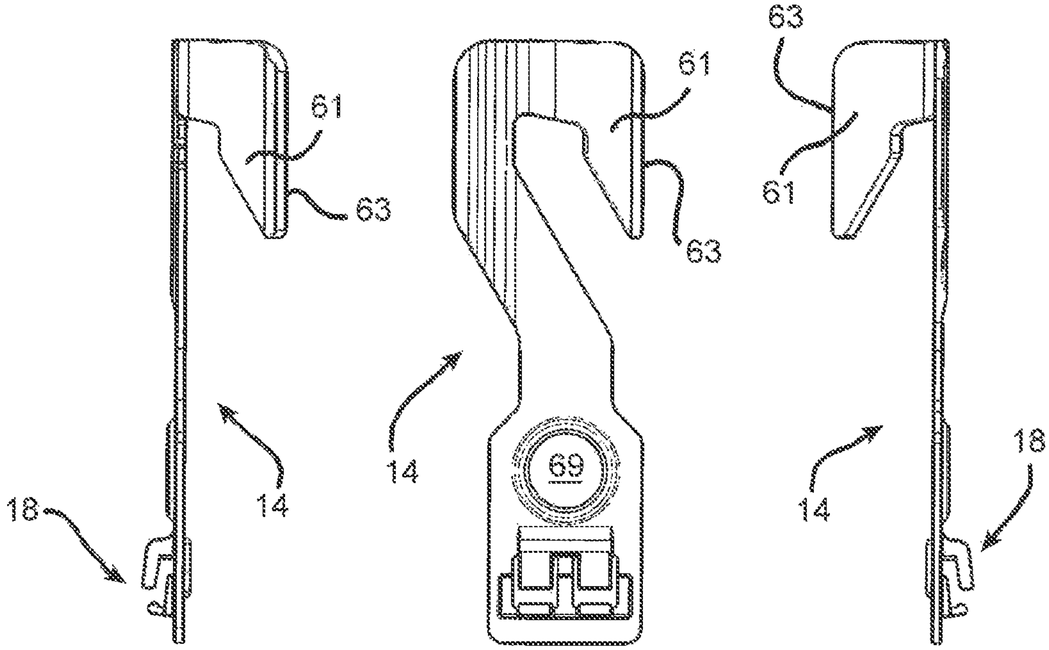
Figure 53:
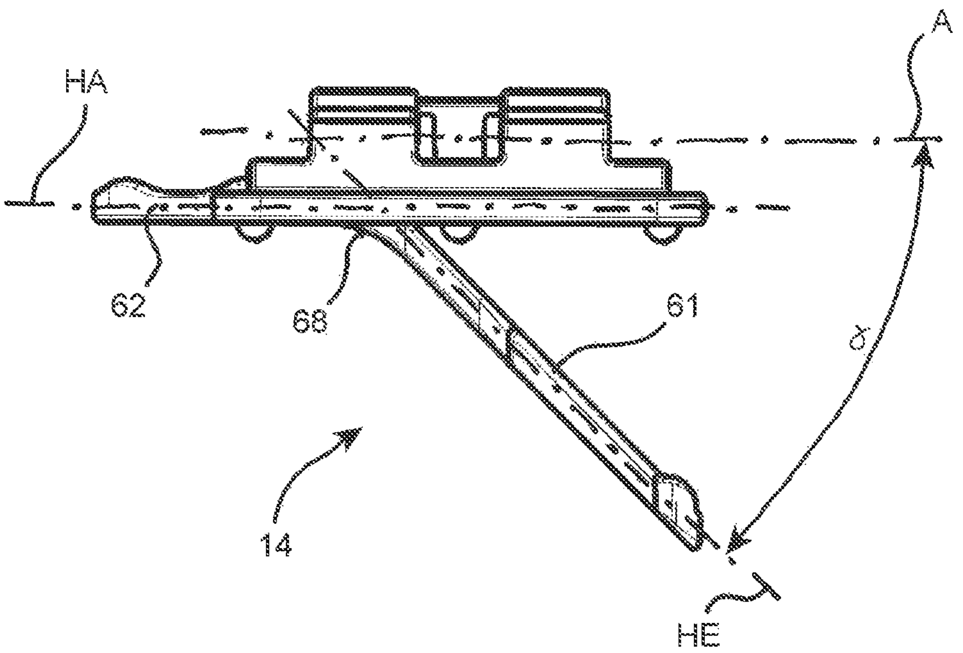

Embodiments are described by way of example in the following, with reference to the accompanying drawings, in which:

FIG. 1: is a perspective view of an embodiment of the long material according to the invention in a non-use position;

FIG. 2: is a rear view from the left of the long material shown in FIG. 1;

FIG. 3: is a view from the left of the long material shown in FIG. 2;

FIG. 4: is a view from below of the long material shown in FIG. 3;

FIG. 5: is a perspective view of the long material shown in FIGS. 1 to 4 in a use position;

FIG. 6: is a view from above of the long material shown in FIG. 5;

FIG. 7: is a view from below of the long material shown in FIG. 6;

FIG. 8: is a view from the right of the long material shown in FIG. 6;

FIG. 9: is a perspective view of the long material shown in FIGS. 1 to 8 in an insertion position together with a hand holding it;

FIG. 10: is an enlarged view of the detail D from FIG. 3;

FIG. 11: is a perspective view of a first embodiment of the holding device according to the invention;

FIG. 12: is a sectional view according to the section B-B in FIG. 11;

FIG. 13: is a front view of the holding device shown in FIG. 11 from the front;

FIG. 14: is a sectional view similar to FIG. 12 showing long material introduced into the receiving cavity of the holding device;

FIG. 15: is a sectional view corresponding to FIG. 14, a part of the container additionally being shown;

FIG. 16: shows a second embodiment of the holding device according to the invention comprising a lid holder;

FIG. 17: is a perspective view of the long material shown in FIGS. 5 to 8, the holding device shown in FIG. 16 and a lid in a partially open position;

FIG. 18: is another perspective view of the combination shown in FIG. 17 of the long material, holding device and lid;

FIG. 19: is a perspective view of the combination shown in FIGS. 17 and 18, in addition a flexible container being shown, and the lid being in its closed position;

FIG. 20: is a perspective view of the combination shown in FIG. 19, having a partially open lid;

FIG. 21: is a perspective view of a third embodiment of the holding device according to the invention comprising a holding means in the form of a handle;

FIG. 22: is a perspective view of the holding device shown in FIG. 21 with the long material shown in FIGS. 5 to 8 which stretches the opening edge of a flexible container and is positioned shortly before insertion of a holding portion into the receiving cavity of the holding device;

FIG. 23: shows the holding device shown in FIG. 21 in the state in which it holds the long material shown in FIG. 22 and the flexible container stretched thereby;

FIG. 24: is a perspective view of a fourth embodiment of the holding device according to the invention comprising a hinge;

FIG. 25: is a perspective view of a fifth embodiment of the holding device according to the invention comprising a hook;

FIG. 26: is a perspective view of a sixth embodiment of the holding device according to the invention comprising a clamping means;

FIG. 27: is a perspective view of a seventh embodiment of the holding device according to the invention comprising a rotation means;

FIG. 28: is a perspective view of a combination of the long material shown in FIGS. 5 to 8 comprising two holding devices which each correspond to an eight embodiment of the holding device according to the invention and comprise a different hook from the embodiment shown in FIG. 25;

FIG. 29: is a view from above of the combination shown in FIG. 28;

FIG. 30: is a view from below of the combination shown in FIG. 29;

FIG. 31: is a view from the left of the combination shown in FIG. 29;

FIG. 32: shows the combination shown in FIG. 28 as it hangs on a drawer;

FIG. 33: is a perspective view similar to FIG. 32, in addition the flexible container having the opening edge thereof stretched by the long material being shown;

FIG. 34: is a side view of a ninth embodiment of the holding device according to the invention, which is designed in the form of a multifunctional holder;

FIG. 35: is a perspective view of the multifunctional holder shown in FIG. 34 in a first use position in which it holds the long material, shown in FIGS. 5 to 8, together with the flexible container;

FIG. 36: is a side view of the combination shown in FIG. 35;

FIG. 37: is a perspective view of the multifunctional holder shown in FIG. 34 in a second use position in which it holds the long material, shown in FIGS. 5 to 8, together with the flexible container;

FIG. 38: is a side view of the combination shown in FIG. 37;

FIG. 39: is a perspective view of the multifunctional holder shown in FIG. 34 in a third use position in which it holds the long material, shown in FIGS. 5 to 8, together with the flexible container;

FIG. 40: is a side view of the combination shown in FIG. 39;

FIG. 41: is a perspective view of the multifunctional holder shown in FIG. 34 in a fourth use position in which it holds the long material, shown in FIGS. 5 to 8, together with the flexible container;

FIG. 42: is a side view of the combination shown in FIG. 41;

FIG. 43: is a perspective view of a combination of the holding device shown in FIG. 16, the long material shown in FIGS. 5 to 8, and a flexible container, in addition two clamps holding the opening edge of the flexible container on the long material;

FIG. 44: is a perspective view of a tenth embodiment of the holding device according to the invention comprising a hook and suction cap;

FIG. 45: is a side view of the holding device shown in FIG. 44 from the front, obliquely from the left;

FIG. 46: is a rear view of the rear face of the holding device shown in FIG. 44, obliquely from the left;

FIG. 47: is a perspective view of an eleventh embodiment of the holding device according to the invention comprising a handle and clamping means;

FIG. 48: is a side view of the holding device shown in FIG. 47 from the front, obliquely from the right;

FIG. 49: is a perspective view of a twelfth embodiment of the holding device according to the invention comprising a hook which is also designed as a handle;

FIG. 50: is a side view of the holding device shown in FIG. 49 from the front, obliquely from the right;

FIG. 51: is a view from above of the front face of the holding device shown in FIG. 49, obliquely from the left;

FIG. 52: is a side view of the holding device shown in FIG. 49 from the rear, obliquely from the left; and FIG. 53: is an enlarged front view of the holding device shown in FIG. 49, obliquely from the left.

FIGS. 1 to 4 show an embodiment of a long material 1 according to the invention, which is produced from a strip-like flat material. The strip-like flat material is characterised in that it is substantially longer and wider than it is thick. The cross section thereof is preferably in the shape of a flat or thin rectangle. This has the advantage that the long material 1 has such a low bending resistance about the bend axis positioned perpendicularly on the drawing plane in FIG. 3, that it can be comfortably bent, in a resilient manner, about said bend axis, by the hands of a user.

Alternatively to the embodiment shown, other cross sections of the long material 1 are also conceivable. Within the context of the invention, a circular cross section or a flattened cross section, which is not rectangular, can be used. For example, an elliptically shaped cross section would be conceivable, which, in a manner similar to a rectangular cross section, has one bend axis having a greater bending moment, and one bend axis having a smaller bending moment. In principle, non-round cross sections of the long material 1 are preferably, in view of tilt-resistance holding thereof in the holding device according to the invention.

In the embodiment shown, the long material 1 consists of a one-piece spring steel strip, the strip thickness of which is designed such that bending by hand about the bend axis positioned perpendicularly on the drawing plane in FIG. 3 is easily possible. It is alternatively conceivable to produce the long material 1 from different one-piece spring elements, for example from resiliently flexible plastics, glass fibre or carbon fibre materials, or other composite materials which have resiliently flexible properties. Furthermore, it is alternatively conceivable not to form the long material 1 in one piece but rather to assemble it from two or more separate segments which are interconnected in a suitable manner.

The long material 1 comprises the free ends 2, 3 denoted in FIG. 1, on each of which a handling means in the form of an end portion 8 and 9, respectively, is formed, which is in each case bent out of a strip plane of the long material 1, which is located perpendicularly on the drawing plane of FIG. 3, about the angle α shown in FIG. 3. In the view of FIG. 3, the longitudinal axis LA of the long material 1 coincides with the strip plane thereof.

In the embodiment shown, the angle α is constant over the extension of the end portions 8, 9 and is preferably in the range of from 10° to 85°, particularly preferably in the range of from 40° to 80°. It is alternatively conceivable to not keep the angle α constant over the extension or length of the end portions 8, 9, but rather so as to increase and/or decrease in order to form differently designed handling means, such that for example end portions extending in a manner curved in the manner of a circle or spiral would result. The angle α visible in FIG. 3 then forms a starting angle at which the end portion 8 or 9 emerges from the strip plane.

In FIG. 2, the long material 1 projected into the drawing plane is shown. In this view, it has a projected material length in the form of the strip length L, which is slightly shorter than the length which would result if the end portions 8, 9 were to be bent back into the strip plane. Furthermore, the material width in the form of the (actual) strip width B of the long material 1 can be seen in FIG. 2.

The projected strip length L and the strip width B of the long material 1 are to be designed and/or dimensioned in view of the fact that on the one hand a portion of the opening edge of the opening of a flexible container is intended to be held in a straight stretched manner between the free ends 2, 3 of the long material 1, and on the other hand dimensionally stable stretching of the flexible container is intended to take place exclusively in the region of the opening thereof, while the container remains flexible in its remaining region. The ratio of the projected strip length L to the strip width B is at least 20:1, particularly preferably at least 40:1. If common household waste sacks for plastics material ("recycling sack") are intended to be stretched with the long material 1, then a projected strip length L of approximately 1 m and a strip width B of approximately 12 mm are suitable.

In FIGS. 1 to 4, the long material 1 is shown in a non-use position, in which it is not used for stretching the opening edge of a flexible container, and in which it can be stored. It can be bent resiliently from said non-use position into an insertion position, which is shown in FIG. 9. In the insertion position, in the embodiment shown, the long material 1 forms a loop, the dimensions of which within the loop plane allow for the long material 1 to be inserted into the opening of a flexible container, which is to be stretched in a dimensionally stable manner.

The handling means, in the form of the end portions 8, 9 bent out of the strip plane here, play an important role, in connection with the insertion position. They make it possible for the long material 1, located in the insertion position, to be able to be held in a form-fitting manner, by a hand H of a user of the long material 1, shown in FIG. 9, during insertion of the long material into the opening of the flexible container. As shown in FIG. 9, it is possible to hold the long material 1 in the insertion position, in which it is bent in a loop-like manner, merely using the thumb and forefinger, as well as the end portions 8, 9. On account of the resiliency thereof, in the insertion position the long material 1 endeavours to assume the non-use position shown in FIGS. 1 to 4. It is thus preloaded into the non-use position.

In the insertion position shown in FIG. 9, the long material can be inserted into an opening 5 of a flexible container 6 and released. In this case, the user's hand that is not required for holding the long material 1 can hold open the opening edge 4 of the opening 5, as best it can. After the hand H has released the long material 1, on account of its preload said material endeavours to assume the non-use position thereof shown in FIGS. 1 to 4. Since the long material 1 is located in the opening 5 of the container 6, this is not possible. Rather, the long material 1 is prevented from assuming the non-use position by the opening edge 4. Instead, it assumes a use position shown in FIGS. 5 to 8 and in particular in FIG. 22, in which use position it stretches the opening edge 4 of the opening 5 of the container 6 in a dimensionally stable manner. The opening edge 4 has a width corresponding to the strip width B. On account of the resiliency thereof, in its use position the long material 1 is again preloaded into the non-use position, but no longer with such a high restoring force as in the insertion position according to FIG. 9.

As can be seen in FIGS. 5, 6 and 22, the long material 1 assumes approximately the shape of a U in the use position thereof. In this U-shape, the end portions 8 and 9 are at a distance from one another, such that a closed loop, as in FIG. 9, is no longer formed. As shown in FIG. 22, a portion 7 of the opening edge 4 of the opening 5 comes to rest along said distance, which edge is held in a manner stretched substantially straight, on account of the restoring force of the long material 1, in the non-use position. In the use state thereof, the long material 1 therefore stretches the opening edge 4 with a straight peripheral portion, the length of which is made up of the length of the end portion 8, the length of the distance between the end portions 8 and 9, and the length of the end portion 9.

FIG. 10 shows the enlarged view of the detail D from FIG. 3. In the embodiment shown, an anti-slip coating 13 functioning as an anti-slip surface is located on the left-hand side 12, in FIGS. 3 and 10, of the strip-like long material 1, which anti-slip coating may for example be a silicone or rubber coating. In the use position thereof, the side 12 of the long material 1 comes into contact with the opening edge 4 and thereby increases the static friction between the side 12 and the opening edge 4. As a result, in addition to the effect of the preload of the long material 1, slipping of the opening edge 4 of the container 6 from the long material 1 is impeded. Alternatively or in addition, the anti-slip surface can be formed by mechanical projections which protrude in an elevated manner from the side 12. It is furthermore conceivable to also provide the side 10 of the long material 1 opposite the side 12 with an anti-slip surface of the type mentioned above. This additionally increases the static friction between the opening edge 4 and the long material 1, when the opening edge 4 is folded into the opening 5, around the long material 1, onto the side 10.

FIGS. 11, 12 and 13 show a first embodiment of the holding device 14 according to the invention, which in this case is produced from plastics material, in an injection moulding process. The one-piece holding device 14 in the embodiment shown is made up of two components, specifically a fastening flange 16, which serves as a holding means for holding the holding device 14 against falling down on account of gravity, and a receiving means 18 which serves for receiving a holding portion of the long material 1 and an opening edge region of the opening edge 4 resting on the holding portion.

By means of the two through-holes 42, and two screws or nails (not shown), the fastening flange 16 can be fastened to a fastening surface such as a wall, a front surface, a tabletop, a shelf base, or the like. A flexible container 6, the opening edge 4 of which is stretched in a dimensionally stable manner by a long material 1 located in the use position, can then hang downwards form the fastening surface, on account of gravity (cf. FIG. 22).

As can be seen in FIGS. 11 and 13, the receiving means 18 is arranged on the front side, visible in these figures, of the fastening flange 16. As can be seen most clearly in FIGS. 11 and 12, the receiving means 18 comprises a receiving cavity 28 in the interior thereof, which cavity is designed in a channel-like manner, comprises a longitudinal axis A, and is open at the end faces 43, 44 of the receiving means 18. The receiving cavity 28 is accessible through a slot-like access opening 19.

As shown most clearly in FIG. 12, the receiving cavity 28 has a cross section which is elongate in shape, which does not stand exactly upright in FIG. 12, but rather the upper end of which is slightly inclined in the direction of the rear face 11 of the fastening flange 16. The access opening 19 is located in the bottom half of the cross section of the receiving cavity 28.

In FIG. 12, the receiving cavity 28 is delimited at the bottom by a base projection 20 which comprises a latching lug 22 on the right-hand end thereof in FIG. 12. Towards the front, i.e. towards the right in FIG. 12, the receiving cavity 28 is delimited by a front projection 21. Towards the rear, i.e. towards the left in FIG. 12, the receiving cavity 28 is delimited by a rear wall 17. A shoulder 45, provided in the rear wall 17, is visible in FIG. 12, which shoulder extends such that a cross-sectional widening 23 results in an upper region of the cross-sectional shape of the receiving cavity 28, which widening serves as a buffer space for receiving material of the opening edge region of a thickened opening edge 4 of the container 6, which region is intended to be received in the receiving cavity 28.

In order to fasten the flexible container 6, which is shown for example in FIG. 22 and can be a sack or a bag for household, garden or other purposes, to the holding device 14, the following procedure is performed:

Firstly, the long material 1 is bent resiliently from the non-use position thereof show in FIGS. 1 to 4 into the insertion position thereof according to FIG. 9. Then it is inserted into the opening 5 of the container 6, such that it assumes the use position thereof, shown in FIGS. 5 to 8, within the opening edge 4 of the opening 5, in which use position it stretches the opening edge 4 in a dimensionally stable manner. In this case, the periphery of the opening edge 4, stretched in a dimensionally stable manner, comprises the straight portion visible in FIG. 22, the length of which is made up of the sum of the lengths of the two end portions 8, 9 and that of the portion 7 of the opening edge 4 not touched by the long material 1 or the end portions 8, 9.

The combination, thus prepared, consisting of the container 6 and the long material 1, is then introduced into the receiving cavity 28 of the receiving means 18 from the bottom right in FIG. 12, counter to the effect of gravity. The portion of the long material 1 which thereby comes to rest inside the channel-like receiving cavity 28 is denoted in the present case as the holding portion of the long material 1. The region of the opening edge 4, which rests on one or both sides on the above-mentioned holding portion of the long material 1, and thus likewise comes to rest in the receiving cavity 28 of the receiving means 18, is dented in the present case as the opening edge region of the opening edge 4.

FIG. 14 shows the way in which the holding portion of the long material 1, located in the use position, is held in the receiving cavity 28 under the action of gravity, i.e. under a tilting moment acting in the anticlockwise direction in FIG. 14. The way in which the upper end of the holding portion rests on or presses against the front projection 21 is visible. The way in which the lower end of the holding portion rests or is supported on the lower end of the rear wall 17 is also visible. Before the lower end of the holding portion has reached this position, during insertion through the access opening 19 it has overcome the latching lug 22, which, for this purpose, has briefly bent away downwards in a resilient manner. The slight inclination of the upper region of the cross section of the receiving cavity 28 in the direction of the rear face 11 of the fastening flange 16 makes it possible for the plane spanned by the long material 1, i.e. the plane spanned by the opening edge 4 of the container 6, to be positioned approximately perpendicularly on the rear face 11 of the fastening flange 16, visible on the right-hand side in FIG. 14.

In FIG. 15 a part of the container 6 is also shown, in addition to the illustration in FIG. 14. As is visible, the opening edge region of the opening edge 4 of the container 6, coming to rest in the receiving cavity 28, is located between the holding portion of the long material 1 and the rear wall 17 of the receiving cavity 28. If a part of the opening edge 4 were to be turned down from the top, inwards into the long material 1, on the side 10 thereof (cf. FIG. 10), then in FIG. 15 material of the opening edge 4 would also be located to the left of the holding portion, which material would form an additional layer of the opening edge region, within the meaning of the present invention.

FIG. 16 shows a second embodiment of the holding device 14 according to the invention. It is designed exactly like the holding device shown in FIGS. 11 to 13, in addition a lid holder 24 for fastening a pivotable lid 25 being provided, by means of which lid the opening 5 of the container 6 can be closed. In the embodiment shown, the lid holder 24 is formed upwards, as an extension of the front projection 21. In this case, it consists of two limbs 26, 46, angled relative to one another, the limb 46 being positioned perpendicularly on the plane spanned by the fastening flange 16. The lid holder 24 can also be differently designed, for example approximately in the shape of a quarter circle in cross section, instead of angular as in FIG. 16.

FIGS. 17 and 18 show the way in which the pivotable lid 25 is attached to the lid holder 24. The lid 25 comprises a slot, through which the limb 46 of the lid holder 24 can be guided. In the closed position thereof, the lid 25 is prevented, by the limb 26 of the lid holder 24, visible in FIG. 16, from slipping within the plane of the opening 5. When the lid 25 is opened, the limb 46 prevents the lid 25 from being raised upwards.

FIGS. 19 and 20 show the way in which the flexible container 6 hangs downwards on account of gravity, and in this case the opening 5 thereof, stretched in a dimensionally stable manner by the long material 1, interacts with the lid 25. The holding device 14, which is not visible in these figures, can be fastened to a wall or another suitable fastening surface. The flexible container 6 then hangs downwards on account of gravity, and can be gradually filled.

FIG. 21 shows a third embodiment of the holding device 14 according to the invention. In this case, the receiving means 18 is designed in the same manner as the receiving means 18 of the first embodiment according to FIGS. 11 to 13. In the third embodiment, instead of the fastening flange 16 a handle 15 for guiding the container 6, with the opening edge 4 stretched in a dimensionally stable manner, by hand, is provided as the holding means.

FIGS. 22 and 23 show the way in which the holding device 14 according to FIG. 21 can be used in conjunction with the container 6, the opening edge 4 of which is stretched in a dimensionally stable manner by the long material 1. In FIG. 23, the holding portion of the long material 1 and the opening edge region of the opening edge 4 resting on the holding portion is held securely in the receiving cavity 28 of the receiving means 18 of the holding device 14.

In the configuration shown in FIG. 23, the container 6 can be moved and carried by a user as desired, by means of the handle 15. It is conceivable, for example, to hold the straight portion of the opening edge 4, stretched in a dimensionally stable manner, against a floor or other substrate, and to sweep dirt, dust or other debris into the container 6 using a brush. In this case, the straight portion of the opening edge 4, stretched in a dimensionally stable manner, can advantageously keep the portion of dust, dirt or other debris that passes by the opening 5 as small as possible.

FIG. 24 shows a fourth embodiment of the holding device 14 according to the invention. Here, too, the design of the receiving means 18 corresponds to that of the receiving means 18 of the first embodiment shown in FIGS. 11 to 13. In this case, however, it is not the fastening flange 16 which functions as the holding means, but rather a fastening flange 27 in combination with a hinge 29, which makes it possible to pivot the receiving means 18 relative to the fastening flange 27. In this case, the hinge axis of the hinge 29 extends in parallel with the longitudinal axis A of the receiving cavity 28 of the receiving means 18. This embodiment makes it possible to allow the container 6 to hang down from obliquely positioned fastening surfaces, for example roof slopes, such that the plane spanned by the opening edge 4 extends substantially horizontally. The fastening flange 27 can for example be screwed or adhesively bonded to the fastening surface.

FIG. 25 shows a fifth embodiment of the holding device 14 according to the invention. In this case, too, the design of the receiving means 18 corresponds to the receiving means 18 of the first embodiment according to FIGS. 11 to 13. In this case, instead of the fastening flange 16 a hook 30 serves as the holding means. With the aid thereof, the holding device 14 can be suspended for example on rods, tabletops, shelf bases, or the like.

FIG. 26 shows a sixth embodiment of the holding device 14 according to the invention. The receiving means 18 in turn corresponds to the receiving means 18 of the first embodiment shown in FIGS. 11 to 13. In this case, instead of the fastening flange 16 a clamping means 31 is provided as the holding means, by means of which the holding device 14 can be firmly clamped to a rod or a plate-like object such as a tabletop, such that the flexible container 6 can hang downwards on account of the effect of gravity.

The clamping means 31 comprises an upper clamping plate 47 which extends away from the upper end of the rear wall 17 of the receiving cavity 28, and a lower clamping arm 48 which, as shown in FIG. 26, is designed in this case so as to be bent in an S-shaped manner. In order to firmly clamp the holding device 14 to a plate or a rod, the clamping arm 48 bends resiliently downwards and clamps the plate or the rod between it and the upper clamping plate 47. In the clamping position on the plate or the rod, the clamping arm 48 does not return fully into its unstressed position, which is shown in FIG. 26. In the clamping position, it is preloaded into the unstressed position shown in FIG. 26.

FIG. 27 shows a seventh embodiment of the holding device 14 according to the invention. The embodiment shown comprises three receiving means 18, each of which is designed in the manner of the receiving means 18 of the first embodiment shown in FIGS. 11 to 13. In this case, instead of the fastening flange 16 a rotation means 32 serves as the holding means, which rotation means is assembled from a fixed part 33, which is disc-shaped in this case, and a rotary part 34, which is likewise disc-shaped in this case, and which is rotatably mounted on the fixed part 33. The rotation means 32 can be fastened to a fastening surface, for example the underside of a tabletop, by means of the fixed part 33, the through-hole 49 in the fixed part 33, and a screw penetrating the fixed part 33 and the rotary part 34.

In this case, the rotary part 34 bears three receiving means 18 on the outer periphery thereof, at a uniform angular spacing of 120°. The axis of rotation of the rotary part 34, about which it is rotatable relative to the fixed part 33, is located perpendicularly on the fastening surface. Rotating the rotary part 34 about 120° in each case then makes it possible for a container 6, which was still located under the tabletop prior to the rotation of the rotary part 34, to be rotated into a spatial region in front of the tabletop, such that it can be filled as intended. A container 6 that is located in the spatial region in front of the tabletop prior to the rotation of the rotary part 34, which container may already be completely filled, can be moved into a parked position under the tabletop by means of the rotation. In the case of this embodiment, the rotation means 32 acts as a revolving means.

Alternatively it is conceivable to arrange just two receiving means 18, preferably arranged opposite one another, i.e. offset by an angular spacing of 180°, or just one single receiving means 18, on the rotary part 34, in FIG. 27. If just one single receiving means 18 is arranged on the rotary part

34, then the rotation means 32 allows for the movement of a container 6 between a use position in the spatial region in front of the tabletop and a space-saving parked position under the tabletop.

FIGS. 28 to 31 show a combination of the long material 1 located in the use position, comprising two holding devices 14 according to an eighth embodiment. Each of the two holding devices 14 comprises a receiving means 18 which is designed in the manner of the receiving means 18 of the first embodiment shown in FIGS. 11 to 13. In this case, instead of the fastening flange 16 a hook 35 serves as the holding means.

As denoted in FIG. 29, the hook 35 spans a hook plane HE which is located perpendicularly on the drawing plane of FIG. 29. Said hook plane HE forms, together with the longitudinal axis A of the receiving cavity 28, which is located in the drawing plane of FIG. 29, an angle β which should be neither 0° (cf. FIG. 25) nor 90°. The angle β is preferably in the range of from 60° to 85°. As can be seen most clearly in FIGS. 29 and 31, the two holding devices 14 are not identical with respect to the orientation of the hook 35 relative to the respective receiving means 18. As can be seen in FIG. 31, the hook 35 of the holding device 14 arranged on the left there is turned towards the right, while the hook 35 of the holding device 14 arranged on the right there is turned towards the left. In terms of amount, however, the two holding devices 14 have the same angle β.

By means of holding devices 14 which are associated with one another in pairs, as are shown in FIGS. 28 to 31, the long material 1 located in the use position can be held at the end portions 8 and 9 thereof. For this purpose, as described in connection with the first embodiment according to FIGS. 11 to 15, the end portions 8 and 9 are inserted into the receiving cavity 28 of the respective receiving means 18.

FIG. 32 shows the way in which the combination, shown in FIGS. 28 to 31, of the long material 1 and the two holding devices 14 can be suspended on the front panel 50 of a drawer 51 by means of the hooks 35. If the hook walls of the hooks 35 are designed so as to be sufficiently flat, it is possible for the above-mentioned combination to be suspended on the front panel 50 even in the case of a closed drawer 51.

FIG. 33 shows the way in which the flexible container 6, the opening edge 4 of which is stretched in a dimensionally stable manner by the long material 1, can be suspended on the front panel 50 of the drawer 51 by means of the two holding devices 14 according to the eighth embodiment. Comfortable filling of the container 6 through the opening 5 thereof is possible.

FIG. 34 is a side view of a multifunctional holder, which is a ninth embodiment of the holding device 14 according to the invention. In this case, the handle 36 serves as the holding means within the meaning of the present invention, such that the holding device 14 according to FIG. 35 can be used in a manner comparable to that of the embodiment according to FIGS. 21 to 23. For this purpose, the holding device 14 comprises the first receiving means 18, visible in FIG. 34, which is designed in the same manner as the receiving means 18 of the first embodiment shown in FIGS. 11 to 13.

FIGS. 35 and 36 show the use of the multifunctional holder according to FIG. 34 in conjunction with the first receiving means 18. The container 6, the opening edge 4 of which is stretched in a dimensionally stable manner by means of the long material 1, is held by means of the first receiving means 18. The ergonomically curved handle 36 can be used in the same way as the handle 15 in FIGS. 21 to 23. In addition to the handle 36, in this case an additional handle 41 is provided, which extends in a direction substantially facing away from the handle 36 and, in the embodiment shown, is designed in the manner of a hammer. As can be seen in particular in FIG. 36, the additional handle 41 extends slightly into the space above the opening 5 of the container 6, such that the additional handle 41 can advantageously serve for carrying the container 6, filled to a greater or lesser extent and thus of a greater or lesser weight, by hand, in a balanced manner, since the additional handle 41 is located closer to the centre of gravity of the filled container 6 than the handle 36.

As can be seen in FIG. 34, the multifunctional holder comprises a second receiving means 37 which is arranged opposite the first receiving means 18. The second receiving means 37 is designed in the same manner as the receiving means 18 of the first embodiment shown in FIGS. 11 to 13, it merely being arranged in a mirror-inverted manner compared with the receiving means 18 in FIG. 12 on the one hand and FIG. 34 on the other hand.

FIGS. 37 and 38 show how the multifunctional holder according to FIG. 34 is used in conjunction with the second receiving means 37. The handle 36 does not extend outwards, away from the opening edge 4, as in the case of FIGS. 35 and 36, but rather into the space above the opening 5, and thus quasi inwards into the opening edge 4. In this configuration, the handle 36 can serve as a clamping arm, by means of which the container 6, having the opening edge 4 stretched in a dimensionally stable manner, can be firmly clamped to a tabletop, a shelf base, or the like, in a parked position. If the handle 36 located above the opening 5 does not interfere during filling of the container 6, the container 6 can be held by means of the additional handle 41 and can be filled as intended, in this state.

As can be seen in FIG. 34, the multifunctional holder further comprises a third receiving means 39 and a fourth receiving means 40. Each of the two receiving means 39 and 40 is designed in the same manner as the receiving means 18 of the first embodiment shown in FIGS. 11 to 13. According to FIG. 34, the receiving means 39 and 40 are arranged opposite one another and in a manner mirror-inverted with respect to one another. Furthermore, a hook means 38 is arranged on the left-hand end of the handle 36 in FIG. 34, which hook means faces away from the receiving means 18, 37, 39 and 40.

FIGS. 39 and 40 show the use of the multifunctional holder according to FIG. 34 in conjunction with the third receiving means 39. The handle 36 extends substantially perpendicularly upwards. The hook means 38 faces the container 6 or the opening 5 thereof. In this configuration, the handle 36 serves as a suspension arm and the container 6, having the opening edge 4 stretched in a dimensionally stable manner, can be suspended for example on a rear edge of a shelf base or the like, by means of the hook means 38.

FIGS. 41 and 42 show the use of the multifunctional holder according to FIG. 34 in conjunction with the fourth receiving means 40. In this case too the handle 36 extends substantially perpendicularly upwards as a suspension arm, as in FIGS. 39 and 40. However, the hook means 38 faces away from the container 6 or the opening 5 thereof. In this configuration, the container 6, having the opening edge 4 stretched in a dimensionally stable manner, can be suspended for example on the front edge of a shelf base, on a table edge, or the like, by means of the hook means 38.

The multifunctional holder according to FIG. 34 can be modified in that one or two of the four receiving means 18, 37, 39 and 40 are omitted without replacement. It would be conceivable, for example, to provide only the first receiving means 18, the third receiving means 39 and the fourth receiving means 40. A further alternative would, for example, be that of arranging exclusively the first receiving means 18 and the third receiving means 39. In this connection, the terms "first", "second", "third" and "fourth", which are used, are not intended to mean a specification of the corresponding number of receiving units.

FIG. 43 shows the container 6 having the opening edge 4 stretched in a dimensionally stable manner, as it is held by the holding device 14 according to FIG. 16. As shown in FIG. 10, an anti-slip coating 13 is applied to the side 12 of the long material 1, which coating increases the static friction between the inside of the opening edge 4 of the container 6 and the side 12 of the long material 1. This is important in particular when the container 6 becomes increasingly heavy as the filling level increases, and there is a risk that the opening edge 4 could slip down from the long material 1.

In order to minimise this risk in the individual case, the clamps 52, 53 shown in FIG. 43 can be fitted onto the long material 1 and the opening edge 4. The clamps 52, 53 in each case comprise a receiving cavity, the structure of which is designed in the manner of the receiving cavity 28 of the first embodiment of the holding device 14 shown in FIGS. 11 to 13. However, it must be ensured that the size of the receiving cavity of the respective clamps 52, 53 is dimensioned such that the long material 1 and the opening edge 4 are pressed together by the respective clamps 52, 53. In this way, the static friction between the long material 1 and the opening edge 4 is increased at least at points, in addition to the anti-slip coating 13, where the clamps 52, 53 are attached.

FIGS. 44 to 46 show a tenth embodiment of the holding device 14 according to the invention. In this case, the receiving means 18 performs the same function as the receiving means 18 of the first embodiment shown in FIGS. 11 to 13, but for reasons of advantageous material saving is designed in a slightly deviating manner in terms of structure.

As can be seen, the front projection 21 shown in FIG. 12 does not extend continuously in this case, but rather is designed so as to be hollowed in the central region thereof, such that two front projections (not denoted in further detail) result. In the same way, the base projection 20 shown in FIG. 12 does not extend continuously, but rather is likewise designed so as to be hollowed in the central region thereof, such that two base projections (not denoted in further detail) result, each comprising a latching lug which corresponds, in functional terms, to the latching lug 22 shown in FIGS. 12 and 13. Furthermore, the rear face 11 visible in FIG. 12 is not designed in this case so as to be closed, but rather is provided with rectangular through-holes (not denoted in further detail), as is most clearly visible in FIG. 46.

In the tenth embodiment, two rear wall regions 65 which are comparatively small in terms of surface area, and which in this case are located outside the receiving cavity 28 denoted in FIG. 12 and of which only one is visible in FIG. 44, assume the support function of the lower end of the rear wall 17 of the receiving cavity 28 shown in FIG. 12, against the tilting moment acting in the anticlockwise direction in FIG. 14.

The structural differences between the receiving means 18 of the tenth embodiment and the receiving means 18 of the first embodiment do not have any influence on the fundamental mode of operation of both receiving means 18, which have been described, in connection with FIGS. 11 to 15, by way of example and in a representative manner for all embodiments in connection with the first embodiment.

The holding device 14 according to FIGS. 44 to 46 comprises a combination of two holding means, specifically on the one hand a suction cap 54 and on the other hand a hook 55. In this way, the practical value of the holding device 14 is increased, since fastening of the holding device 14 to flat surfaces such as tiles, or suspension of the holding device 14 on for example rods, shelves, worktops or the like is made possible. The suction cap 54 is releasably fastened to the hook 55, for example by means of an in particular knurled nut 66 for screwing onto a threaded rod (not visible in this case) which is provided on the suction cap side. As a result, when the suction cap 54 is worn it can be easily replaced by a new suction cap.

FIGS. 47 and 48 show an eleventh embodiment of the holding device 14 according to the invention. The design of the receiving means 18 corresponds to that of the receiving means 18 of the first embodiment shown in FIGS. 11 to 13.

The eleventh embodiment comprises a combination of two different holding means. On the one hand, a preferably elongate handle 56 serves, in the same way as the handle 15 shown in FIGS. 21 to 23, for holding and guiding the container 6 stretched using the long material 1. On the other hand, a preferably elongate clamping limb 57 is provided on the holding device 14, which limb extends proceeding from the lower end of the receiving means 18. As the distance from the receiving means 18 increases, the spacing between the clamping limb 57 and the underside of the handle 56, facing said clamping limb, reduces, as can be seen most clearly in FIG. 48. On account of material resiliency, the clamping limb 57 can be resilient bent away from the handle 56, i.e. downwards in FIGS. 47 and 48.

The clamping limb 57 and the handle 56 thus form a clamping means 59 in which the handle 56, more precisely the underside thereof facing the clamping limb 57, functions as a counter clamping limb 58. The handle 56 therefore fulfils a dual function in this case.

Using the clamping means 59, the holding device 14 can be laterally slid onto a tabletop, a shelf base, a worktop, or the like, and thus firmly clamped in a frictionally engaged manner. For this purpose, the free end 67 of the clamping limb 57 can be angled away from the handle 56, within the meaning of an insertion aid, as can be seen in FIG. 47.

FIGS. 49 to 53 show a twelfth embodiment of the holding device 14 according to the invention. The design of the receiving means 18 corresponds to that of the receiving means 18 of the tenth embodiment shown in FIGS. 44 to 46.

In the twelfth embodiment, a hook 60 is provided as the holding means, which hook comprises a first hook portion 61 and a second hook portion 62. The first hook portion 61 spans a hook plane HE denoted in FIG. 53, which, together with the cavity axis of the receiving cavity 28, i.e. together with the longitudinal axis A of the receiving cavity 28, forms an angle $\Upsilon$ that is greater than 0° and smaller than 90°. The angle $\Upsilon$ is preferably in the range of from 30° to 70°, particularly preferably in the range of from 40° to 60°. In the embodiment shown, the angle $\Upsilon$ is 45°. The second hook portion 62 is located in a main plane HA of the holding device 14, which is denoted in FIG. 53. The main plane HA and the second hook portion 62 form the angle $\Upsilon$ together with the hook plane HE.

In the twelfth embodiment, the first hook portion 61 comprises a first side edge 63, and the second hook portion 62 comprises a second side edge 64. As can be seen most clearly in FIG. 49, the side edges 63 and 64 extend straight and in parallel with one another.

On account of the deviation point 68 between the hook portions 61 and 62, denoted in FIGS. 49 and 53, and the straight side edges 63 and 64 extending in parallel with one another, the hook 60 has an overall geometry which is particularly well suited, from a physiological viewpoint, to be gripped or covered by a palm of a hand of a user. In FIG. 49, the palm could be placed on the hook portions 61 and 62 from above, and in the process grip the side edges 63 and 64.

The hook 60 thus fulfils the function of two different types of holding means within the meaning of the present invention, on the one hand the function of a hook, and on the other hand the function of a handle, such as the handles 15 or 56, in FIGS. 21 and 47, respectively. In this case, the user can be assisted, by means of a through-hole 69 visible in FIGS. 49 and 51, in guiding the holding device 14, together with the stretched container 6 located thereon, in a more reliable and stable manner, when using the hook 60 as a handle. For this purpose, in addition to grasping the hook 60 with the palm, said user can grip through the through-hole 69 for example using the forefinger of the grasping hand.

LIST OF REFERENCE SIGNS

1 Long material
2 Free end of the long material 1
3 Free end of the long material 1
4 Opening edge of the container 6
5 Opening of the container 6
6 Flexible container
7 Portion of the opening edge 4 stretched in a straight manner
8 End portion of the long material 1
9 End portion of the long material 1
10 Side of the long material 1
11 Rear face of the fastening flange 16
12 Side of the long material 1
13 Anti-slip surface, anti-slip coating
14 Holding device
15 Handle
16 Fastening flange
17 Rear wall of the receiving cavity 28
18 Receiving means
19 Access opening
20 Base projection
21 Front projection
22 Latching lug
23 Cross-sectional widening of the receiving cavity 18
24 Lid holder
25 Lid
26 Limb of the lid holder 24
27 Fastening flange
28 Receiving cavity
29 Hinge
30 Hook
31 Clamping means
32 Rotation means
33 Fixed part of the rotation means 32
34 Rotary part of the rotation means 32
35 Hook
36 Handle
37 Second receiving means
38 Hook means of the handle 36
39 Third receiving means
40 Fourth receiving means
41 Additional handle
42 Through-hole in fastening flange 16
43 End face of the receiving means 18
44 End face of the receiving means 18
45 Shoulder in the rear wall 17
46 Limb of the lid holder 24
47 Clamping plate of the clamping means 31
48 Clamping arm of the clamping means 31
49 Through-hole in fixed part 33
50 Front panel of the drawer 51
51 Drawer
52 Clamp
53 Clamp
54 Suction cap
55 Hook
56 Handle
57 Clamping limb
58 Counter clamping limb=handle 56
59 Clamping means
60 Hook
61 First hook portion of the hook 60
62 Second hook portion of the hook 60
63 First side edge of the hook 60
64 Second side edge of the hook 60
65 Rear wall region
66 Nut for fastening the suction cap 54
67 Free end of the clamping limb 57
68 Deviation point between hook portions 61 and 62
69 Through-hole
A Longitudinal axis of the receiving cavity 28
$\alpha$ Angle of the end portion 8, 9 relative to the longitudinal axis LA
B Material width of the long material 1
$\beta$ Angle between hook plane HE and longitudinal axis A
$\gamma$ Angle between hook plane HE and longitudinal axis A, and between the hook portions 61 and 62
H Hand of a user
HA Main plane
HE Hook plane of the hook 35 or 60
LA Longitudinal axis of the long material 1
L Projected length of the long material 1

The invention claimed is:

1. A long material for stretching an opening edge of an opening of a flexible container, the long material being resiliently bendable and comprising two free ends, the long material being able to be brought, by means of resilient bending, from a non-use position, in which it is not used for stretching the opening edge, into an insertion position in which it is preloaded and endeavours to assume the non-use position, the long material being able to be inserted into the opening in the insertion position, the long material inside the opening being able to be brought into a use position, in which it is preloaded and endeavours to assume the non-use position, in such a way that the opening edge is stretched in a dimensionally stable manner, the free ends of the long material are spaced apart from one another and hold a portion of the opening edge therebetween in a straight stretched manner, and dimensionally stable stretching takes place exclusively in a region of the opening of the container, while the container remains flexible in a remaining region of the container, the free ends being formed by handling means for holding the long material in the insertion position in a form-fitting manner, during insertion of the long material into the opening, the handling means being formed by end portions of the long material, which form a starting angle, relative to a longitudinal axis of the long material, which is greater than 0°, and the long material being formed by a strip-like flat material, wherein the end portions are bent out of a flat material plane of the flat material.

2. The long material according to claim 1, wherein it consists of a one-piece spring element.

3. A long material for stretching an opening edge of an opening of a flexible container, the long material being resiliently bendable and comprising two free ends, the long material being able to be brought, by means of resilient bending, from a non-use position, in which it is not used for stretching the opening edge, into an insertion position in which it is preloaded and endeavours to assume the non-use position, the long material being able to be inserted into the opening in the insertion position, and the long material inside the opening being able to be brought into a use position, in which it is preloaded and endeavours to assume the non-use position, in such a way that the opening edge is stretched in a dimensionally stable manner, the free ends of the long material are spaced apart from one another and hold a portion of the opening edge therebetween in a straight stretched manner, and dimensionally stable stretching takes place exclusively in a region of the opening of the container, while the container remains flexible in the remaining region of the container, wherein at least a side of the long material which comes into contact with the container, in the use position, comprises an anti-slip surface for increasing static friction between the side and the container, in order to make it more difficult for the opening edge of the container to slide off the long material, in addition to the effect of the preload of the long material, the anti-slip surface being formed by an anti-slip coating.

4. The long material according to claim 3, wherein it consists of a one-piece spring element.

5. A holding device for holding a flexible container comprising an opening having an opening edge, the opening edge being stretched in a dimensionally stable manner by means of a long material, the long material being resiliently bendable and comprising two free ends, the long material being able to be brought, by means of resilient bending, from a non-use position, in which it is not used for stretching the opening edge, into an insertion position in which it is preloaded and endeavours to assume the non-use position, the long material being able to be inserted into the opening in the insertion position, the long material inside the opening being able to be brought into a use position, in which it is preloaded and endeavours to assume the non-use position, in such a way that the opening edge is stretched in a dimensionally stable manner, the free ends of the long material are spaced apart from one another and hold a portion of the opening edge therebetween in a straight stretched manner, and dimensionally stable stretching takes place exclusively in a region of the opening of the container, while the container remains flexible in a remaining region of the container, the free ends being formed by handling means for holding the long material in the insertion position in a form-fitting manner, during insertion of the long material into the opening, the handling means being formed by end portions of the long material, which form a starting angle, relative to a longitudinal axis of the long material, which is greater than 0°, and the long material being formed by a strip-like flat material, wherein the end portions are bent out of a flat material plane of the flat material; and wherein the holding device comprises:

a holding means for holding the holding device against falling down on account of gravity, and a first receiving means for receiving a holding portion of the long material and an opening edge region of the opening edge resting on the holding portion, the holding portion together with the opening edge region being insertable into a receiving cavity of the first receiving means substantially by way of a movement directed counter to the effect of gravity.

6. The holding device according to claim 5, wherein the receiving cavity has an elongate cross-sectional shape, and the first receiving means has an access opening in a lower half of the cross-sectional shape, through which opening the holding portion, together with the opening edge region, can be inserted into the receiving cavity and can be removed from the receiving cavity.

7. The holding device according to claim 6, wherein a cross-sectional widening is provided in an upper half of the elongate cross-sectional shape, which widening serves as a buffer space for receiving material of the opening edge region of a thickened opening edge of the container.

8. The holding device according to claim 5, wherein the holding means is a handle for guiding the container, with the opening edge stretched in a dimensionally stable manner, by hand, the handle being arranged such that it protrudes outwards from the opening edge when the holding device holds the container.

9. The holding device according to claim 5, wherein the holding means is a hook, by means of which the holding device can be suspended such that the flexible container can hang downwards on account of the effect of gravity.

10. The holding device according to claim 9, wherein the receiving cavity has a cavity axis and the hook spans a hook plane, the cavity axis intersecting the hook plane at an angle which is larger than 0° and smaller than 90°.

11. The holding device according to claim 5, wherein the holding means is a suction cap, by means of which the holding device can be fastened to a flat surface such that the flexible container can hang downwards on account of the effect of gravity.

12. The holding device according to claim 11, wherein a further holding means in the form of a hook is provided, the suction cap being arranged on the hook.

13. The holding device according to claim 8, wherein it comprises a clamping limb in addition to the handle, the handle being designed, in addition to its form as a handle per se, as a counter clamping limb, such that the clamping limb together with the counter clamping limb forms a clamping means which is provided as a further holding means in addition to the holding means in the form of the handle.

14. The holding device according to claim 10, wherein the hook is designed as a further holding means in the form of a handle which can be grasped by a user's hand, in that it comprises a first hook portion, which is located in the hook plane, and a second hook portion, which is angled about an angle relative to the hook plane.

15. The holding device according to claim 14, wherein the first hook portion comprises a first side edge, and the second hook portion comprises a second side edge, the first and the second side edge extending straight and in parallel with one another.

16. The holding device according to claim 14, wherein it comprises a reach-through hole for reaching through with a finger of the user's hand.

17. The holding device according to claim 15, wherein it comprises a reach-through hole for reaching through with a finger of the user's hand.

18. The holding device according to claim 7, wherein the holding means is a handle for guiding the container, with the opening edge stretched in a dimensionally stable manner, by hand, the handle being arranged such that it protrudes outwards from the opening edge when the holding device holds the container.

19. The holding device according to claim 6, wherein the holding means is a hook, by means of which the holding device can be suspended such that the flexible container can hang downwards on account of the effect of gravity.

20. The holding device according to claim 7, wherein the holding means is a hook, by means of which the holding device can be suspended such that the flexible container can hang downwards on account of the effect of gravity.

* * * * *